United States Patent
Tsukagoshi

(10) Patent No.: US 10,104,406 B2
(45) Date of Patent: Oct. 16, 2018

(54) TRANSMISSION APPARATUS, TRANSMISSION METHOD, REPRODUCTION APPARATUS, REPRODUCTION METHOD AND RECEPTION APPARATUS

(71) Applicant: Saturn Licensing LLC, New York, NY (US)

(72) Inventor: Ikuo Tsukagoshi, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/787,597

(22) PCT Filed: Jun. 16, 2014

(86) PCT No.: PCT/JP2014/065947
§ 371 (c)(1),
(2) Date: Oct. 28, 2015

(87) PCT Pub. No.: WO2014/203871
PCT Pub. Date: Dec. 24, 2014

(65) Prior Publication Data
US 2016/0088321 A1  Mar. 24, 2016

(30) Foreign Application Priority Data

Jun. 21, 2013 (JP) .................. 2013-131147

(51) Int. Cl.
*H04N 21/2387* (2011.01)
*H04N 21/2362* (2011.01)
(Continued)

(52) U.S. Cl.
CPC ....... *H04N 21/2387* (2013.01); *H04N 21/236* (2013.01); *H04N 21/23614* (2013.01);
(Continued)

(58) Field of Classification Search
CPC ......... H04N 21/2387; H04N 21/23614; H04N 21/2362; H04N 21/2365
(Continued)

(56) References Cited

U.S. PATENT DOCUMENTS 5,870,523 A    2/1999  Kikuchi et al.
6,363,212 B1 * 3/2002  Fujinami .............. G06T 9/007
                                                375/E7.267
(Continued)

FOREIGN PATENT DOCUMENTS

EP    0 724 264 A2    7/1996
EP    3 007 392 A1    4/2016
(Continued)

OTHER PUBLICATIONS

International Search Report dated Sep. 9, 2014 in PCT/JP2014/065947.
(Continued)

*Primary Examiner* — Nathan Flynn
*Assistant Examiner* — Tung T Trinh
(74) *Attorney, Agent, or Firm* — Oblon, McClelland, Maier & Neustadt, L.L.P.

(57) ABSTRACT

An increase in the speed of trick reproduction is achieved. A transmission stream, in which first transmission packets that are multilayer-configuration packets each having a multiplexed transport packet in an upper layer are continuously arranged is transmitted. In the transmission stream, the specific first transmission packets each including the multiplexed transport packet including data in which a first byte of an access unit of a random access point starts and having a header in which identification information is inserted are arranged at a predetermined interval. In addition, in the transmission stream, second transmission packets each including access position information corresponding to the
(Continued)

previous and next specific first transmission packets and having a header in which identification information is inserted are arranged following the specific first transmission packets.

20 Claims, 28 Drawing Sheets

(51) Int. Cl.
    *H04N 21/2365*     (2011.01)
    *H04N 21/236*     (2011.01)
    *H04N 21/258*     (2011.01)
    *H04N 21/434*     (2011.01)
    *H04N 21/643*     (2011.01)
    *H04N 21/845*     (2011.01)

(52) U.S. Cl.
    CPC ..... *H04N 21/25816* (2013.01); *H04N 21/434* (2013.01); *H04N 21/64322* (2013.01); *H04N 21/8455* (2013.01)

(58) Field of Classification Search
    USPC .......................................................... 725/25
    See application file for complete search history.

(56) References Cited

U.S. PATENT DOCUMENTS

| | | | | |
|---|---|---|---|---|
| 6,460,086 | B1* | 10/2002 | Swaminathan | G06F 9/445 375/E7.024 |
| 6,463,101 | B1* | 10/2002 | Koto | G11B 27/034 375/240.13 |
| 2001/0005448 | A1* | 6/2001 | Okada | G11B 27/034 386/332 |
| 2003/0152364 | A1 | 8/2003 | Wajs | |
| 2005/0034156 | A1* | 2/2005 | Terui | H04H 20/06 725/40 |
| 2005/0190781 | A1* | 9/2005 | Green | H04L 29/06027 370/432 |
| 2008/0225892 | A1* | 9/2008 | Vare | H04L 1/0083 370/473 |
| 2009/0074382 | A1* | 3/2009 | Itoh | G11B 27/105 386/334 |
| 2010/0135646 | A1* | 6/2010 | Bang | H04N 5/775 386/241 |
| 2011/0208829 | A1* | 8/2011 | Kwon | H04N 21/234327 709/217 |
| 2011/0255558 | A1* | 10/2011 | Hwang | H04L 65/60 370/474 |
| 2012/0185907 | A1* | 7/2012 | Park | H04N 21/236 725/110 |
| 2013/0094518 | A1 | 4/2013 | Bae | |
| 2014/0007172 | A1* | 1/2014 | Rhyu | H04N 21/2362 725/109 |
| 2014/0201795 | A1* | 7/2014 | Huber | H04L 65/4076 725/110 |
| 2015/0020138 | A1* | 1/2015 | Bae | H04N 21/2343 725/116 |
| 2016/0094687 | A1* | 3/2016 | Kwon | H04N 21/6332 370/474 |
| 2016/0112731 | A1* | 4/2016 | Tsukagoshi | H04N 21/236 725/109 |

FOREIGN PATENT DOCUMENTS

| | | |
|---|---|---|
| JP | 2002-281456 | 9/2002 |
| JP | 2003-530785 | 10/2003 |
| JP | 2004-260522 | 9/2004 |
| JP | 3995207 B2 | 8/2007 |
| JP | 2009-100265 | 5/2009 |
| JP | 2012-15875 | 1/2012 |
| RU | 2010136977 A | 3/2012 |
| WO | WO 02/15579 A1 | 2/2002 |

OTHER PUBLICATIONS

Extended European Search Report dated Feb. 17, 2017 in Patent Application No. 14813076.8.
Shuichi Aoki, et al., "Efficient Multiplexing Scheme for IP Packets Over the Advanced Satellite Broadcasting System" IEEE Transactions on Consumer Electronics, IEEE Service Center, vol. 55, No. 1, XP011255254, Feb. 1, 2009, pp. 49-55.
Office Action issued in Russian Patent Application No. 2015153626/07 dated Oct. 2, 2017, AO and AY are cited within, 7pages.
Notification of Grant issued in Russian Patent Application No. 2015153626/07 dated Feb. 2, 2018, AO cited within, 10 pages.
Recommendation ITU-R BT.1869 Multiplexing scheme for variable-length packets in digital multimedia broadcasting systems BT Series Broadcasting service (television), Geneva, Mar. 2010, 20 pages.
Office Action issued in Japanese Patent Application No. 2015-522920 dated Jun. 5, 2018, citing reference AO, 4 pages.

\* cited by examiner

FIG. 3

| Syntax | No. of Bits | Format |
|---|---|---|
| TMCC ( ) { | | |
| for( 0 ; N < 120 ; N++) { | | |
|     RELATIVE STREAM NUMBER | 4 | uimslbf |
| } | | |
| for ( 0 ; M < 15 ; M++) { | | |
|     TRANSMISSION STREAM ID | 16 | uimslbf |
|     STREAM TYPE | 8 | bslbf |
| } | | |
| for ( 0 ; p < 120; p++){ | | |
|     slot p  top pointer | 16 | bslbf |
|     slot p  last pointer | 16 | bslbf |
| } | | |
| for ( 0; n < 15; n++){ | | |
|     packet_length OF RELATIVE STREAM N | 16 | uimslbf |
|     RELATIVE STREAM SYNCHRONIZATION PATTERN BIT LENGTH | 8 | uimslbf |
|     RELATIVE STREAM SYNCHRONIZATION PATTERN | 32 | bslbf |
| } | | |
| } | | |

| STREAM TYPE OF RELATIVE STREAM 0 | STREAM TYPE OF RELATIVE STREAM 1 | STREAM TYPE OF RELATIVE STREAM 2 | ... | STREAM TYPE OF RELATIVE STREAM 15 |
|---|---|---|---|---|
| 8 | 8 | 8 | | 8 |

(b)

| VALUE | ASSIGNMENT |
|---|---|
| 00000000 | UNDEFINED |
| 00000001 | MPEG2-TS |
| 00000010 | TLV |
| 00000011 ~ 11111110 | UNDEFINED |
| 11111111 | NO ASSIGNMENT TYPE |

TOP POINTER AND LAST POINTER

FIG. 6
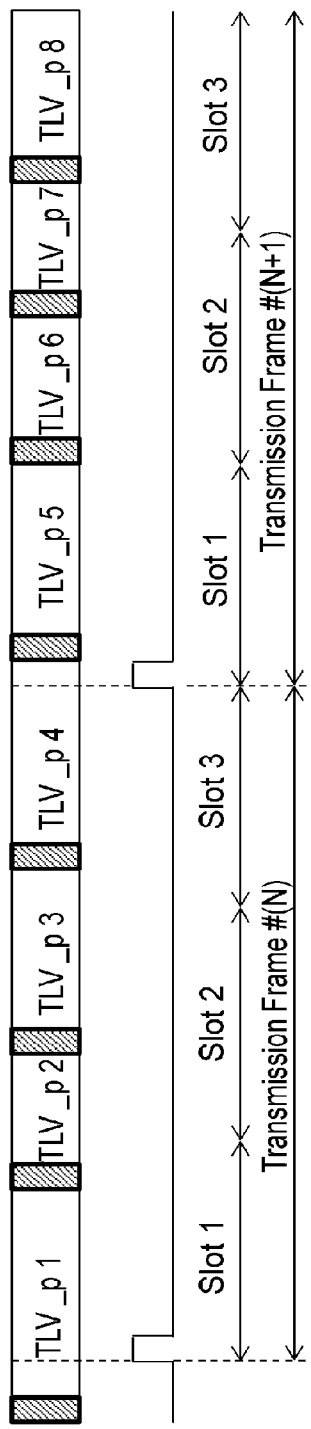
(a) EXAMPLE IN WHICH ARRANGEMENT OF TLV PACKET DOES NOT DEPEND ON START OF TRANSMISSION FRAME
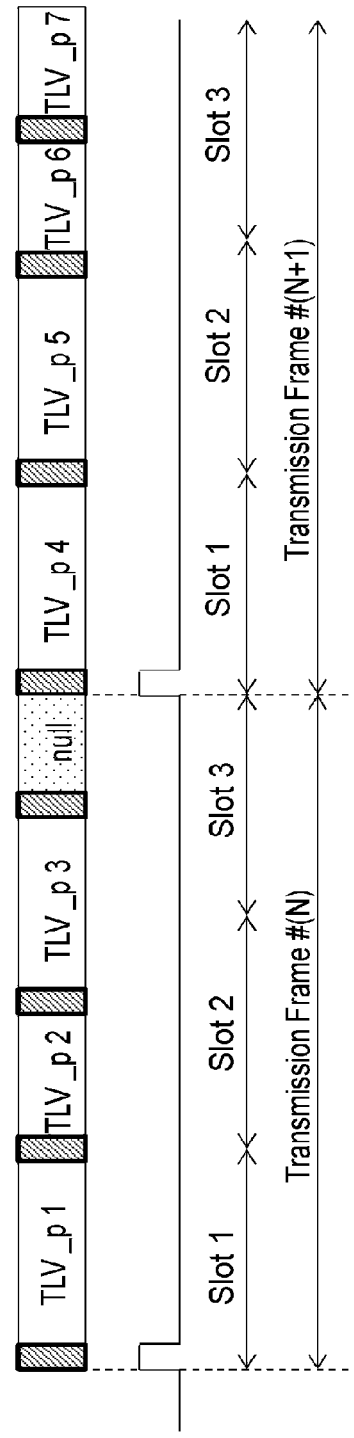
(b) EXAMPLE IN WHICH ARRANGEMENT OF TLV PACKET DEPEND ON START OF TRANSMISSION FRAME

FIG. 10

MMT payload header

| Syntax | No. of Bits | Format |
|---|---|---|
| mmtp_payload_header(){ | | |
| payload_length | 16 | uimsbf |
| payload_type | 8 | bslbf |
| fragmentation_indicator | 2 | bslbf |
| fragment_count_flag | 1 | bslbf |
| aggregation_info_flag | 1 | bslbf |
| random_access_point_flag | 1 | bslbf |
| payload_sequence_number_flag | 1 | bslbf |
| header_extension_field_flag | 1 | bslbf |
| reserved | 1 | bslbf |
| data_offset | 8 | uimsbf |
| if( fragment_count_flag == 1){ | | |
| fragment_count | 8 | uimsbf |
| numDU | 8 | uimsbf |
| if (aggregation_info_flag == 1){ | | |
| for ( I = 0 ; I < numDU ; i++ ) | | |
| DU_offset | 16 | uimsbf |
| } | | |
| if (payload_sequence_number_flag == 1) | | |
| payload_sequence_number | 32 | uimsbf |
| if (header_extension_field_flag == 1) | | |
| mmtp_payload_header_extension() | | |
| } | | |

FIG. 11

MMT payload header extension

| Syntax | No. of Bits | Format |
|---|---|---|
| mmtp_payload_header_extension() { | | |
|   payload_header_extension_type | 16 | bslbf |
|   payload_header_extension_length | 16 | uimsbf |
|   if (payload_header_extension_type == 0x01) | | |
|     presentation_timestamp /* in NTP format*/ | 32 | uimsbf |
|   else if (mfu_payload_header_type == 0x02){ | | |
|     decoding_timestamp /* in NTP format*/ | 32 | uimsbf |
|     presentation_timestamp /* in NTP format*/ | 32 | uimsbf |
|   } | | |
|   else if (mfu_payload_header_type == 0x03) | | |
|     presentation_timestamp /* in 90KHz */ | 32 | uimsbf |
|   else if (mfu_payload_header_type == 0x04){ | | |
|     decoding_timestamp /* in 90KHz */ | 32 | uimsbf |
|     presentation_timestamp /* in 90KHz */ | 32 | uimsbf |
|   } | | |
|   else{ | | |
|   } | | |
| } | | |

FIG. 12

| Syntax | No. of Bits | Format |
|---|---|---|
| TLV packet() { | | |
|   TLV_header | 32 | bslbf |
|   TLV_payload | | uimsbf |
| } | | |

*FIG. 13*

| Syntax | No. of Bits | Format |
|---|---|---|
| TLV_packet { | | |
| '01' | 2 | bslbf |
| non_priority_bit1 | 1 | bslbf |
| non_priority_bit2 | 1 | bslbf |
| non_priority_bit3 | 1 | bslbf |
| reserved_future_use | 3 | '111' |
| packet_type | 8 | bslbf |
| length | 16 | uimsbf |
| if (packet_type==0x01) | | uimslbf |
| IPv4_packet ( ) | | |
| else if (packet_type==0x02) | | |
| IPv6_packet ( ) | | |
| else if (packet_type==0x03) | | |
| compressed_ip_packet( ) | | |
| else if (packet_type==0xFE) | | |
| signalling_packet ( ) | | |
| else if (packet_type==0xFF){ | | |
| for(i=0;i<N;i++){ | | |
| NULL | 8 | bslbf |
| } | | |
| } | | |
| } | | |

FIG. 14

Semantics

Non_priority_bit1 (1bits)
 1 NON-PRIORITY TLV PACKET
  (DATA IN WHICH FIRST BYTE OF ACCESS UNIT OF RANDOM ACCESS POINT IS NOT INCLUDED)
 0 PRIORITY TLV type1 PACKET
  (DATA IN WHICH FIRST BYTE OF ACCESS UNIT OF RANDOM ACCESS POINT IS INCLUDED)

Non_priority_bit2 (1bits)
 1 NON-PRIORITY TLV PACKET
  (NONE OF TIMING INFORMATION AND START PORTION OF ATTRIBUTE INFORMATION AT TIME OF DISPLAYING RANDOM ACCESS POINT IS INCLUDED)
 0 PRIORITY TLV type2 PACKET
  (TIMING INFORMATION OR START PORTION OF ATTRIBUTE INFORMATION AT TIME OF DISPLAYING RANDOM ACCESS DISPLAY IS INCLUDED)

Non_priority_bit3 (1bits)
 1 NON-PRIORITY TLV PACKET
  (ACCESS POSITION INFORMATION IS NOT INCLUDED)
 0 PRIORITY TLV type3 PACKET
  (ACCESS POSITION INFORMATION IS INCLUDED)

FIG. 15 packet type

| packet type value | Assignment |
|---|---|
| 0x00 | Reserved |
| 0x01 | IPv4 packet |
| 0x02 | IPv6 packet |
| 0x03 | Header compressed IP packet |
| 0x04 – 0xFD | Reserved |
| 0xFE | Transmission Control Signal packet (signaling packet) |
| 0xFF | Null packet |

FIG. 16

| Syntax | No. of Bits | Format |
|---|---|---|
| signaling_packet { | | |
| table_id | 8 | uimsbf |
| Pointer_previous TLV_priority packet | 16 | ustcmbf |
| Pointer_next TLV_priority packet | 16 | ustcmbf |
| } | | |

FIG. 17

Semantics

Table_id (8bits)　　DEFINE EXTENSION BY ASSIGNING reserved AREA.

Pointer_previous TLV_priority packet　　(16bits)
　　　　DISPLAY BYTE OFFSET VALUE TOWARD PREVIOUS priority packet.
　　　　priority packet IS PACKET HAVING ANY ONE OF priority1 AND priority2.

Pointer_next TLV_priority packet　　(16bits)
　　　　DISPLAY BYTE OFFSET VALUE TOWARD NEXT priority packet.
　　　　priority packet IS packet HAVING ANY ONE OF priority1 AND priority2.

FIG. 19
(a) 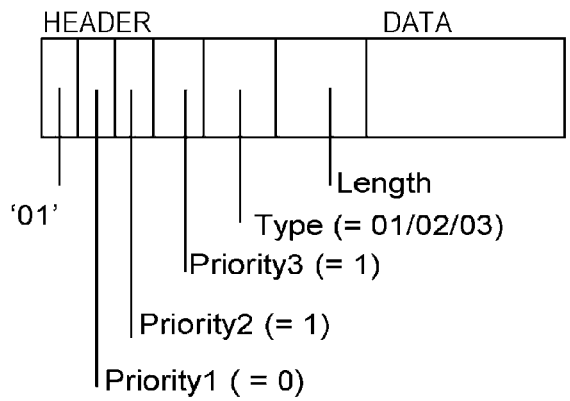
(b) 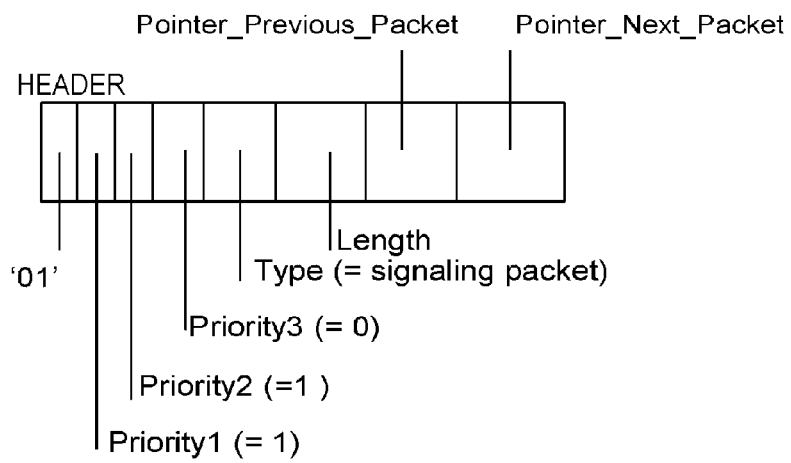
(c) 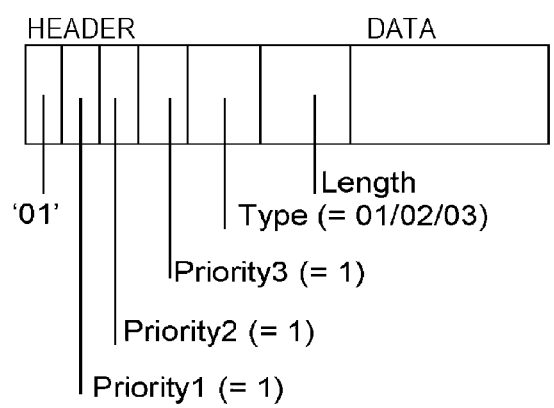

FIG. 22

| Field | Value | Description |
|---|---|---|
| Version(4) Hdr Len (4) | 4(0x0100) | =Version 4 REPRESENT LENGTH OF IP HEADER IN UNITS OF 32 BITS. LENGTH OF IP HEADER IS 20 BYTES IN CASE WHERE THERE IS NO OPTION, 5(0x0101) IS STORED. |
| TOS (8) | | Type Of Service. AMONG SERVICE TYPE FIELDS, PRIORITY FIELD OF 3 BITS AND TOS FIELD OF 5 BITS ARE DEFINED ACCORDING TO RFC 1349, AND THIS FUNCTION AT CURRENT TIME POINT IS HARDLY MOUNTED FOR CONTROL, AND PRIORITY FIELD OF 3bits REPRESENTS SIGNIFICANCE OF IP PACKET AND NORMALLY REPRESENTS HIGHEST PRIORITY. |
| Total Length in bytes (16) | | Packet Length (in Bytes) |
| Identification (16) | | ID NUMBER IS RECORDED IN ORIGINAL IP PACKET, AND IP PACKET DIVIDED ACCORDING TO FRAGMENTATION NEED TO BE RECONFIGURED IN ROUTER DISPOSED IN MIDDLE AND RECEPTION HOST, AND, FOR CORRECT RECONFIGURATION, INDIVIDUAL FRAGMENTATION IS CONFIGURED TO BE IDENTIFIABLE AS FRAGMENTATION OF ORIGINAL IP PACKET. |
| Flags (3) | | FIRST BIT IS UNUSED, AND SECOND BIT DESIGNATES WHETHER OR NOT FRAGMENTATION IS PERMITTED. IN CASE OF FRAGMENTATION, THIRD BIT REPRESENTS MIDDLE OR END OF ORIGINAL IP PACKET. |
| Fragment Offset (13) | | IN CASE WHERE IP PACKET IS FRAGMENTED, IT REPRESENTS POSITION THAT REPRESENTS SEQUENCE OF FRAGMENTATION. |
| Time to Live (8) | | IT REPRESENTS MAXIMAL PERIOD OF LIFE DURING WHICH IP PACKET LIVE ON INTERNET. PURPOSE IS TO PREVENT IP PACKET OF WHICH DESTINATION IS NOT FOUND FROM CONTINUING TO BE CIRCULATED ON NETWORK |
| Protocol (8) | | IDENTIFY HIGH-ORDER PROTOCOL. 1 ICMP 2 IGMP 3 TCP 17 UDP 41 IPv6 89 OSPF |
| Header Checksum (16) | | 16-BIT FILED OF IP HEADER. ONLY HEAD IS CHECKED THROUGH CRC |
| Source IP Address(32) | | TRANSMISSION SOURCE IP ADDRESS |
| Destination IP Address(32) | | DESTINATION IP ADDRESS |

FIG. 23

Options

| Syntax | No. of Bits | Format |
|---|---|---|
| Options{ | | |
|     type_copy | 1 | bslbf |
|     type_class | 2 | bslbf |
|     type_number | 5 | ustclbf |
|     length | 8 | ustclbf |
|     for( i = 0; i<length; i++) | | |
|         information | 8 | ustclbf |
|     } | | |
| } | | |

FIG. 24

```
type_copy    (1bit)
             1              COPIED WITHIN FIRST fragment
             0              COPIED OVER ALL fragments type_class   (2bits)        TYPE OF TARGET TO BE APPLIED
             00             Datagram control
             01             reserved
             10             Debugging and Management
             11             reserved type_number  (5bits)
             00000          End of Option
             00001          No operation
             00011          Loose source route
             00100          Timestamp
             00111          Record route
             01001          Strict source route
             01111          Media Access Priority information
             01110          Media Access offset position
```

FIG. 25

Type_number = '01111' (= Media Access Priority Information), AND
Length = 2

INFORMATION USED FOR IDENTIFYING WHETHER OR NOT DATA IN WHICH
    1st byte OF Access Unit OF RAP STARTS IS INCLUDED AND THE LIKE ARE DEFINED.

AT THAT TIME, WHEN Media Priority Information IS "MPI" (16bits),
    0x0001    FIRST BYTE OF Access Unit CONFIGURING RAP
    0x0002    WHETHER TIMING INFORMATION OR START PORTION OF
                    ATTRIBUTE INFORMATION AT TIME OF RAP DISPLAY IS INCLUDED
    0x0000    OTHERS
    others     reserved

FIG. 26

Type_number = '01110' (= Media Access offset position), AND
Length = 4
    INFORMATION USED FOR SUPPLYING RAP AND PACKET
    POSITION FOR SPECIAL REPRODUCTION IS DEFINED.

AT THAT TIME, Media Access offset position backward (16bits) IS
    TRANSMITTED FOLLOWING Media Access offset position forward (16bits).

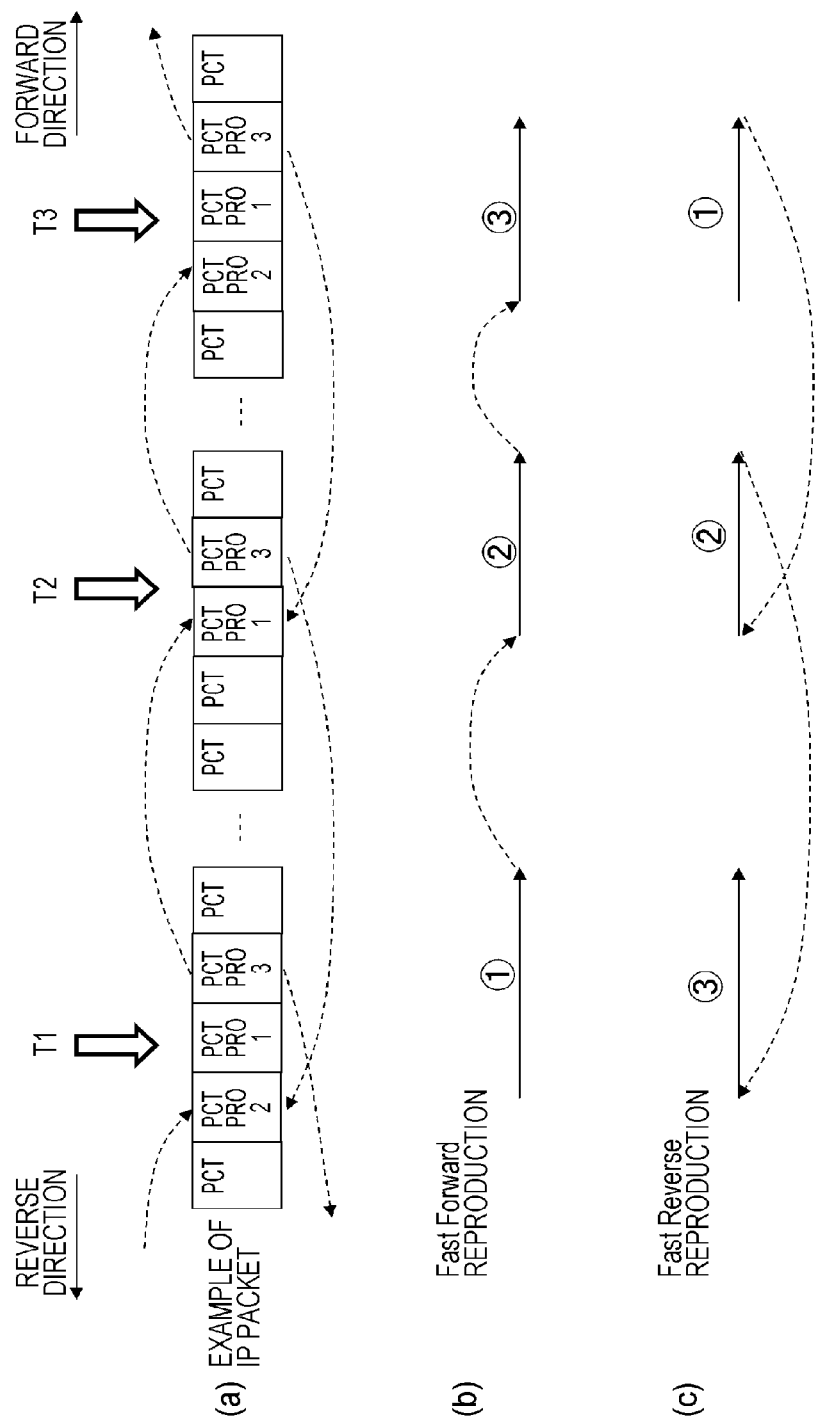

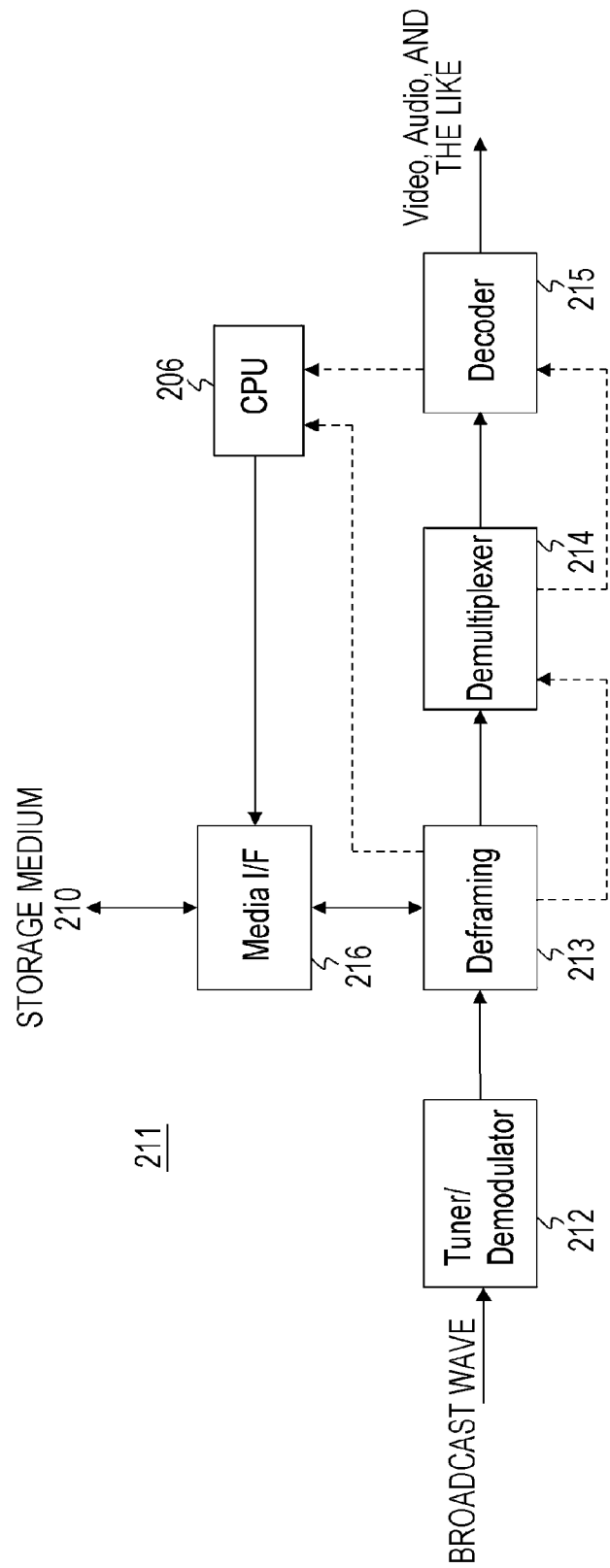

TRANSMISSION APPARATUS, TRANSMISSION METHOD, REPRODUCTION APPARATUS, REPRODUCTION METHOD AND RECEPTION APPARATUS

TECHNICAL FIELD

The present technology relates to a transmission apparatus, a transmission method, a reproduction apparatus, a reproduction method, and a reception apparatus, and more particularly, to a transmission apparatus and the like transmitting a transmission stream in which transmission packets are continuously arranged.

BACKGROUND ART

In a case where a service stream is provided on an IP packet, there are cases where a capsule layer is provided as an interface between a physical layer modulating a transmission channel and an IP packet layer packetizing data (for example, see Patent Document 1). In related art, as information contained in the capsule layer, data having no constraint on time management or file downloading are assumed to be suitable.

CITATION LIST

Patent Document

Patent Document 1: Japanese Patent Application Laid-Open No. 2012-015875

SUMMARY OF THE INVENTION

Problems to be Solved by the Invention

In a case where a service that shares a service using a broadcast wave and an IP transmission service is provided, it may be considered to transmit a real-time service through a capsule layer in addition to a conventional use for file downloading in which a service packet of a broadcast wave is loaded into an IP packet, and a capsule layer is introduced for transmitting the IP packet using the broadcast wave. By the capsule layer configured to have not a fixed length but a variable length, a transmission target of an upper layer can be efficiently transmitted. In the case of video or audio, for example, encapsulation with a size of one access unit or more is executed.

At the time of trick reproduction such as fast forward reproduction or fast reverse reproduction, a capsule having a variable length is analyzed, a multiplexed transport is analyzed, and compressed data is decoded so as to arrive at a display process. In such a case, in order to execute trick reproduction at a high speed, it is necessary to analyze a variable-length packet extending over multiple layers in a speedy manner.

For example, as the capsule layer, a type length value (TLV) will be considered. In such a case, based on a TMCC inserted into a transmission frame, the start of the TLV can be detected as an offset position from a transmission slot. Thereafter, an analysis of an IP/UDP and an IP/TCP is executed, and the payload of a transport packet is analyzed, whereby the presence of a picture of a random access point (RAP) to be displayed as trick play can be acquired eventually.

An object of the present technology is to increase the speed of trick reproduction.

Solutions to Problems

A concept of the present technology lies in
a transmission apparatus including:
a transmission unit that transmits a transmission stream, in which first transmission packets that are multilayer-configuration packets each having a multiplexed transport packet in an upper layer are continuously arranged,
wherein, in the transmission stream, the specific first transmission packets each including the multiplexed transport packet including data in which a first byte of an access unit of a random access point starts and having a header in which identification information is inserted are arranged at a predetermined interval, and, second transmission packets each including access position information corresponding to the previous and next specific first transmission packets and having a header in which identification information is inserted are arranged following the specific first transmission packets.

In the present technology, a transmission stream, in which first transmission packets that are multilayer-configuration packets each having a multiplexed transport packet in an upper layer are continuously arranged is transmitted. In the transmission stream, the specific first transmission packets each including the multiplexed transport packet including data in which a first byte of an access unit of a random access point starts and having a header in which identification information is inserted are arranged at a predetermined interval. In addition, in the transmission stream, second transmission packets each including access position information corresponding to the previous and next specific first transmission packets and having a header in which identification information is inserted are arranged following the specific first transmission packets.

For example, the first transmission packet may be a packet of a capsule layer acquired by encapsulating an IP packet having a payload including the multiplexed transport packet, and the second transmission packet may be a packet of the capsule layer acquired by encapsulating the access position information. In this case, for example, the packet of the capsule layer may be a TLV packet or a GSE packet.

In addition, for example, the first transmission packet may be an IP packet having a payload in which the multiplexed transport packet is included, and the second transmission packet may be an IP packet including the access position information. Furthermore, for example, the multiplexed transport packet may be an MMT packet, an RTP packet, or a FLUTE packet.

As above, in the present technology, in the transmission stream, the specific first transmission packets are arranged to be identifiable at a predetermined interval, and the second transmission packets including the access position information are arranged following the specific first transmission packets. For this reason, on the reception side, in trick reproduction such as fast forward reproduction or fast reverse reproduction after the storage of this transmission stream in a storage medium, data of the access unit of a random access point that is necessary for the trick reproduction can be efficiently acquired, and the trick reproduction can be executed at a high speed.

In addition, another concept of the present technology lies in
    a reproduction apparatus including:
        an acquisition unit that acquires a transmission stream in which first transmission packets that are multilayer-configuration packets each having a multiplexed transport packet in an upper layer are continuously arranged by accessing a storage medium locally connected or a server connected through a communication network;
        a processing unit that acquires reproduction data by processing the transmission stream acquired by the acquisition unit; and
        an access control unit that controls an access of the acquisition unit to the storage medium or the server based on identification information of the specific first transmission packets and access position information included in the second transmission packet that are extracted from the acquired transmission stream,
        wherein, in the transmission stream, the specific first transmission packets each including the multiplexed transport packet including data in which a first byte of an access unit of a random access point starts and having a header in which identification information is inserted are arranged at a predetermined interval, and, second transmission packets each including access position information corresponding to the previous and next specific first transmission packets and having a header in which identification information is inserted are arranged following the specific first transmission packets.

In the present technology, a transmission stream is acquired, by the acquisition unit, in which first transmission packets that are multilayer-configuration packets each having a multiplexed transport packet in an upper layer are continuously arranged by accessing a storage medium or a server connected. Furthermore, reproduction data is acquired, by the processing unit, by processing the transmission stream acquired by in the acquisition unit.

In this transmission stream, the specific first transmission packets each including the multiplexed transport packet including data in which a first byte of an access unit of a random access point starts and having a header in which identification information is inserted are arranged at a predetermined interval. Furthermore, in this transmission stream, second transmission packets each including access position information corresponding to the previous and next specific first transmission packets and having a header in which identification information is inserted are arranged following the specific first transmission packets.

For example, it may be configured such that the first transmission packet is a packet of a capsule layer acquired by encapsulating an IP packet having a payload including the multiplexed transport packet, and the second transmission packet is a packet of the capsule layer acquired by encapsulating the access position information. In such a case, the packet of the capsule layer may be a TLV packet or a GSE packet.

In addition, for example, it may be configured such that the first transmission packet is an IP packet having a payload in which the multiplexed transport packet is included, and the second transmission packet is an IP packet including the access position information. Furthermore, for example, the multiplexed transport packet may be an MMT packet, an RTP packet, or a FLUTE packet.

An access of the acquisition unit to the storage medium or the server is controlled by the access control unit based on identification information of the specific first transmission packets and access position information included in the second transmission packet that are extracted from the acquired transmission stream.

For this reason, according to the present technology, in trick reproduction such as fast forward reproduction or fast backward reproduction, data of the access unit of a random access point that is necessary for the trick reproduction can be efficiently acquired, and the trick reproduction can be executed at a high speed.

In addition, a concept of the present technology lies in
    a reception apparatus including:
        a reception unit that receives a transmission stream, in which first transmission packets that are multilayer-configuration packets each having a multiplexed transport packet in an upper layer are continuously arranged; and
        a processing unit that acquires reception data by processing the transmission stream acquired by the reception unit,
        wherein, in the transmission stream, the specific first transmission packets each including the multiplexed transport packet including data in which a first byte of an access unit of a random access point starts and having a header in which identification information is inserted are arranged at a predetermined interval, and, second transmission packets each including access position information corresponding to the previous and next specific first transmission packets and having a header in which identification information is inserted are arranged following the specific first transmission packets.

Effects of the Invention

According to the present technology, an increase in the speed of trick reproduction is achieved. Here, effects described in this specification are merely examples but are not for the purpose of limitation, and an additional effect may be acquired.

BRIEF DESCRIPTION OF DRAWINGS

FIG. 3 is a diagram that illustrates an example of the structure of TMCC information in a transmission frame.

FIGS. 4(*a*) and 4(*b*) are diagrams that illustrate major contents of an example of the structure of TMCC information in a transmission frame.

FIGS. 6(*a*) and 6(*b*) are diagrams that illustrate an example in which the arrangement of TLV packets is not synchronized with the start of each transmission frame and an example in which the arrangement is synchronized with the start of each transmission frame.

FIG. 10 is a diagram that illustrates an example of the structure of an MMT payload header (mmtp_payload_header( )).

FIG. 11 is a diagram that illustrates an example of the structure of an MMT payload header extension of a case where time information included in an MMT payload header (MPU payload header) is transmitted.

FIG. 12 is a diagram that illustrates an example of the structure of a TLV packet (TLV packet( )).

FIG. 13 is a diagram that illustrates an example of a more detailed structure of a TLV packet.

FIG. 14 is a diagram that illustrates identification information used for identifying whether a packet, which is inserted into the header of a TLV packet, is a packet to be handled with high priority.

FIG. 15 is a diagram that illustrates the packet type of TLV packet.

FIG. 16 is a diagram that illustrates an example of the structure of a signaling packet arranged in a payload of a TLV packet.

FIG. 17 is a diagram that illustrates the content of major information of the example of the structure of the signaling packet.

FIGS. 19(a) to 19(b) are diagrams that schematically illustrate the structures of various TLV packets.

FIG. 22 is a diagram that illustrates contents of major information of the example of the structure of an IP header.

FIG. 23 is a diagram that illustrates an example of the structure of "Options" included inside an IP header.

FIG. 24 is a diagram that illustrates contents of major information of the example of the structure of "Options" included inside the IP header.

FIG. 25 is a diagram that illustrates priority packet identification information defined in the "Options" included inside the IP header.

FIG. 26 is a diagram that illustrates access position information defined in the "Options" included inside the IP header and identification information thereof.

FIGS. 27(a) to 27(b) are diagrams that illustrate a transmission stream (IP packet stream) transmitted by a distribution server.

FIG. 28 is a diagram that illustrates an example of a reception system of a broadcast wave in a receiver.

MODE FOR CARRYING OUT THE INVENTION

Hereinafter, embodiments of the invention (hereinafter, referred to as "embodiments") will be described. The description will be presented in the following order.
1. Embodiment
2. Modified Example
<1. Embodiment>
[Configuration Example of Display System]

Figure 1:
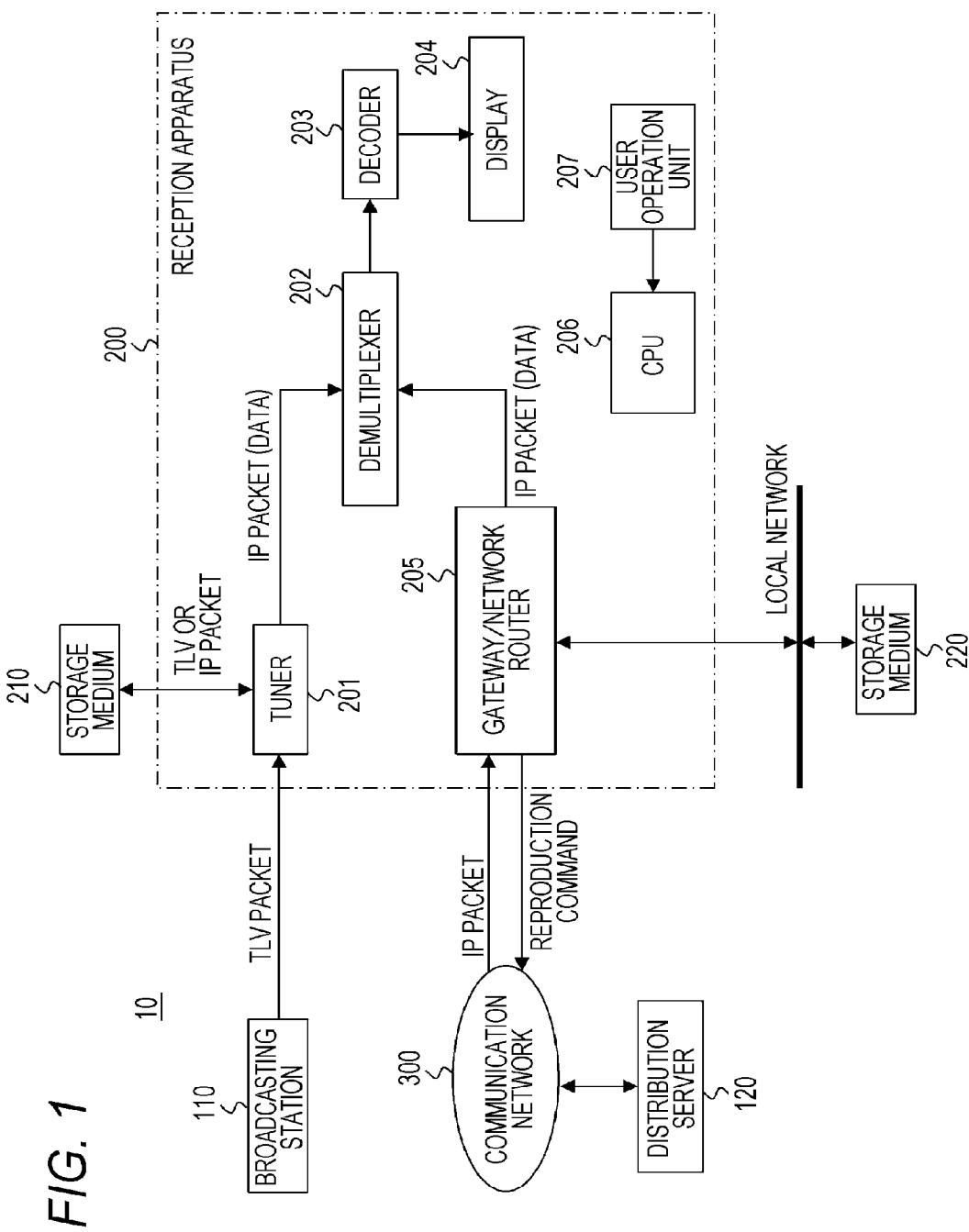
FIG. 1 is a block diagram that illustrates an example of the configuration of a display system according to an embodiment.

FIG. 1 illustrates an example of the configuration of a display system 10. In this display system 10, a broadcasting station 110 and a distribution server 120 are arranged on the transmission side, and a receiver 200 is arranged on the reception side.

The broadcasting station 110 loads a transmission stream in which type length value (TLV) packets as transmission packets are continuously arranged into a broadcast wave and transmits the broadcast wave to the reception side through an RF transmission channel. The TLV packet is a packet having a multilayer configuration including a multiplexed transport packet in an upper layer and media data such as video and audio and is an IP packet including a multiplexed transport packet in a payload or a packet of a capsule layer acquired by encapsulating a transmission control signal (TLV-NIT or AMT).

Figure 2:
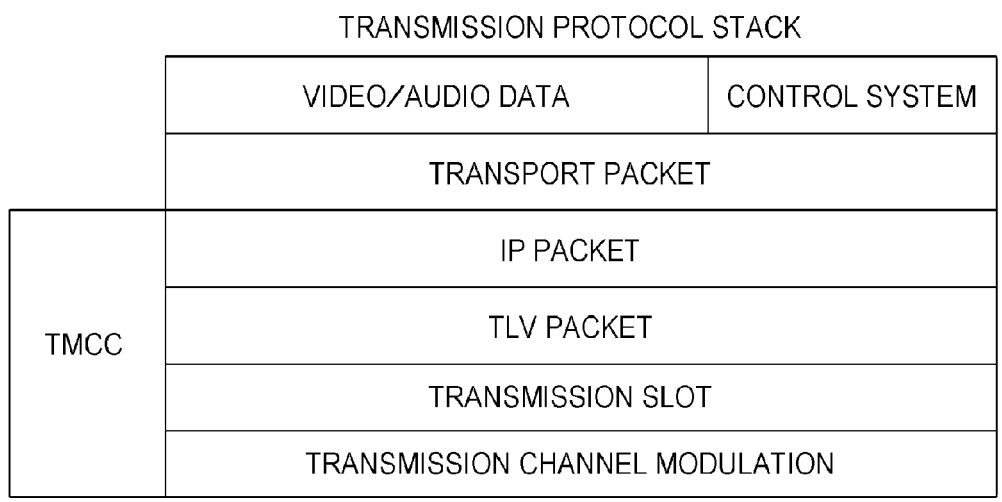
FIG. 2 is a diagram that illustrates a transmission protocol stack.

FIG. 2 illustrates a transmission protocol stack. At the bottom, a transmission channel modulation layer is present. On this transmission channel modulation layer, a transmission slot is present, and a TLV packet is present in the transmission slot, and an IP packet is present on the TLV packet. On this IP packet, a multiplexed transport packet including media data of video or audio and control system data is present through a UDP packet or a TCP packet not illustrated in the drawing.

In one transmission frame, a maximum of 120 transmission slots are included according to a modulation system. To each transmission slot, transmission and multiplexing configuration control (TMCC) information is added. This TMCC information is configured by information relating to transmission control such as the assignment of a transmission stream to each transmission slot and a relation with a transmission system. As one of such TMCC information, pointer information representing the position of a TLV packet in the transmission slot is included. By referring to such pointer information, the analysis can be correctly started from the start of the TLV packet.

An area used for the transmission of the TMCC information is configured by 9422 bits per transmission frame. In a case where switching of the transmission system or the like is executed, the TMCC information goes ahead of actual switching timing by two frames, and information after the switching is transmitted. A minimal update interval of the TMCC information, for example, is one frame. FIG. 3 is a diagram that illustrates an example (Syntax) of the structure of the TMCC information in a transmission frame.

In an advanced broadband satellite digital broadcasting system, a maximum of 16 streams can be transmitted by one satellite repeater. In "relative stream/slot information", a relative stream number that is one of 0 to 15 is assigned to each slot, and data of a slot having the same relative stream number represents one stream.

In addition, in the "relative stream/transmission stream ID information", a transmission stream ID is assigned to each relative stream having a relative stream number in the range of 0 to 15. For example, in a case where the relative stream is an MPEG2-TS, the transmission stream ID is assumed to be a "TS_ID". On the other hand, in a case where the relative stream is a TLV, the transmission stream ID is assumed to be a "TLV stream ID". In addition, "relative stream/stream type information", as illustrated in FIG. 4(a), represents the type of the stream of each relative stream number. As illustrated in FIG. 4(b), for example, "0x01" represents an MPEG2-TS, and "0x02" represents a TLV.

Figure 5:
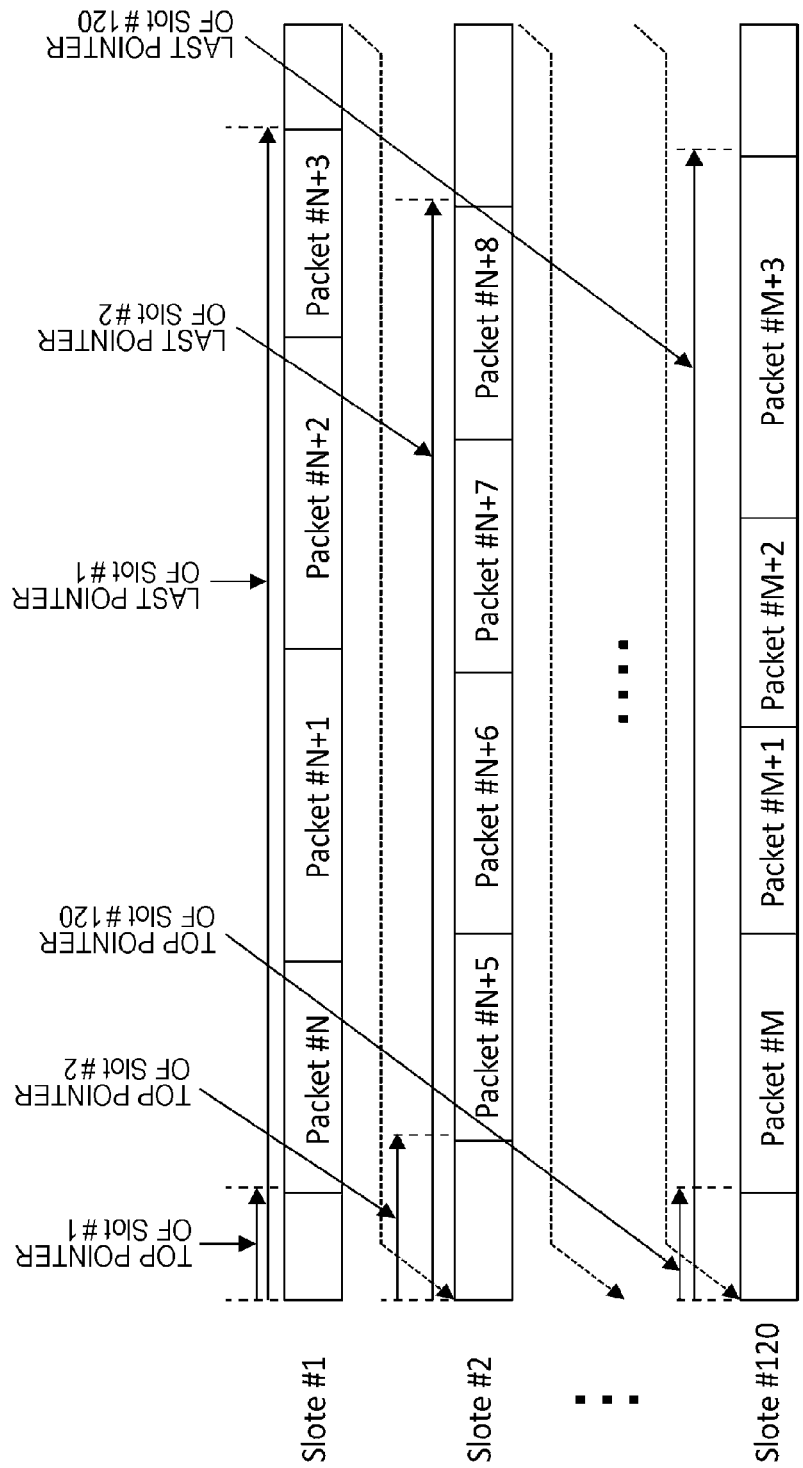
FIG. 5 is a diagram that illustrates an example of housing TLV packets in a data area of each slot of a transmission frame.

In addition, "pointer/slot information" is configured by a top pointer and a last pointer of each slot and is mainly used for packet synchronization and packet invalidation. FIG. 5 illustrates an example of housing TLV packets in a data area of each slot. The top pointer represents the position of the first byte of a first packet among packets housed in each slot. The last pointer represents "the position of the last byte of the last packet+1" among the packets housed in each slot.

In a case where the top pointer is "0xFFFF", it represents that the first byte of the first TLV packet in the slot is not present. This represents that the first TLV packet in the slot is continued from the previous slot. In addition, in a case where the last pointer is "0xFFFF", it represents that the last byte of the last TLV packet in the slot is not present. This represents that the last TLV packet in the slot is continued to the next slot.

FIG. 6(a) represents an example in which the arrangement of TLV packets is not synchronized with the start of each transmission frame. The start of each slot is uniquely determined in a transmission frame. Each TLV packet is present regardless of the slot. In a case where TLV packets are continued over a plurality of transmission frames, there is a TLV packet divided into two transmission frames.

FIG. 6(b) represents an example in which the arrangement of TLV packets is synchronized with the start of each transmission frame. The start of each slot is uniquely determined in a transmission frame. While each TLV packet is not necessarily synchronized with a slot, the start of a transmission frame is the start of a TLV packet. In other words, the start of the first slot (Slot 1) of each transmission frame is the start of a TLV packet.

In the case of FIG. 6(b), a null area is frequently generated at the end of a transmission frame, and the transmission efficiency is lower than that of the case of FIG. 6(a). For the simplification of the drawings, in the examples illustrated in the drawings, three slots are represented to be present in each transmission frame. Actually, as described above, a maximum of 120 slots are included according to the modulation system.

Figure 7:
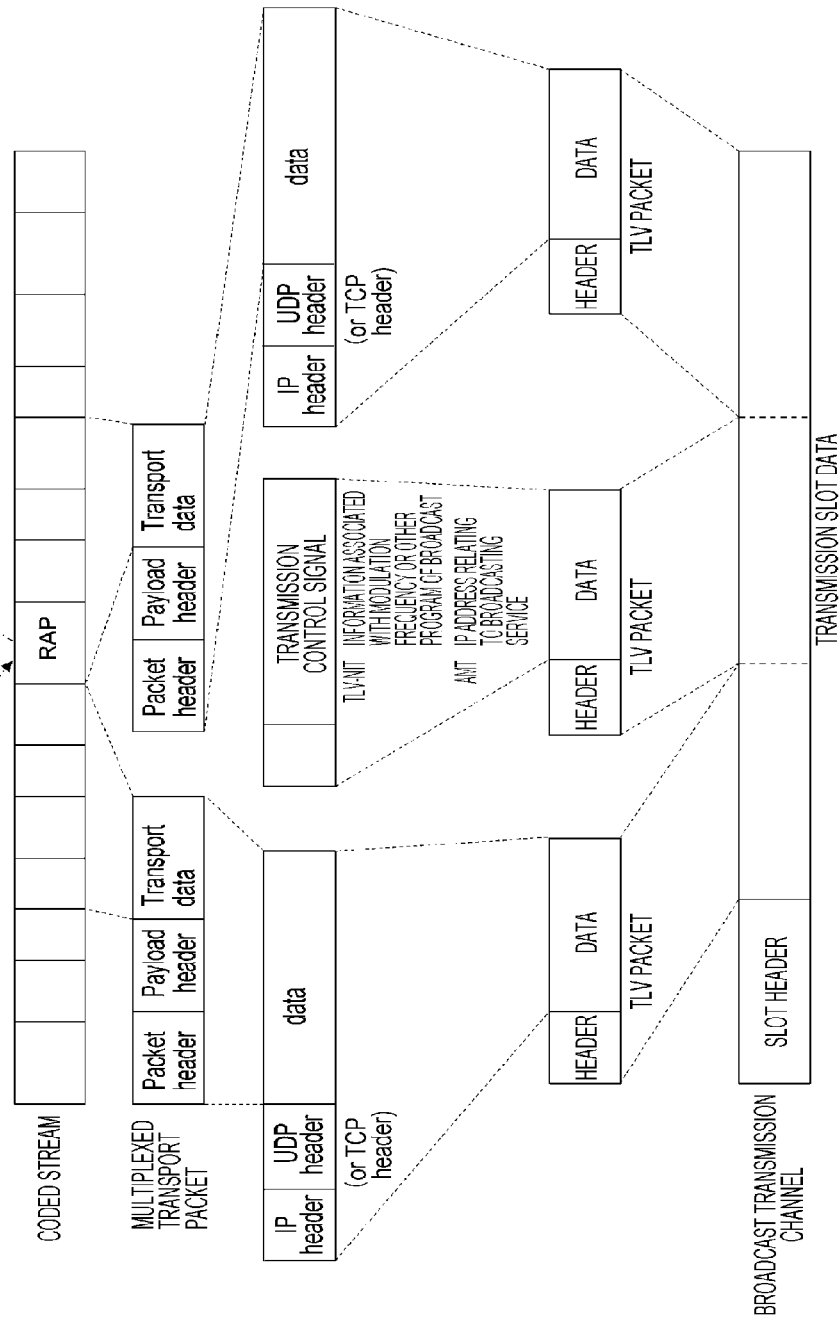
FIG. 7 is a schematic diagram that illustrates the packet configuration of a transmission protocol stack.

FIG. 7 is a schematic diagram that illustrates the packet configuration of a transmission protocol stack. A transmission slot is configured by a slot header and transmission slot data. In the transmission slot data, a TLV packet is included. The TLV packet is configured by a header and data, and, as the data, an IP packet or a transmission control signal is included. The transmission control signal is "TLV-NIT" or "AMT". The "TLV-NIT" is a modulation frequency or information associated with another program of a broadcast. The "AMT" is an IP address relating to a broadcasting service.

The IP packet is configured by an IP header and a UDP packet or a TCP packet as data. Here, the UDP packet is configured by a UDP header and data, and the TCP packet is configured by a TCP header and data. As the data of the UDP packet or the TCP packet, a multiplexed transport packet is included. This multiplexed transport packet is configured by a packet header, a payload header, and transport data.

As the transport data of the multiplexed transport packet, a predetermined number of access units of a coded stream of a transmission medium such as video or audio are included.

In the case of the video, one access unit represents data of one picture. In the case of the audio, one access unit represents an access unit of audio acquired by lumping data of a predetermined number of samples, for example, 1024 samples. In the coded stream, coded data of an intra picture that becomes a random access point is present. For a random access, the coded data of the intra picture is decoded first.

Figure 8:
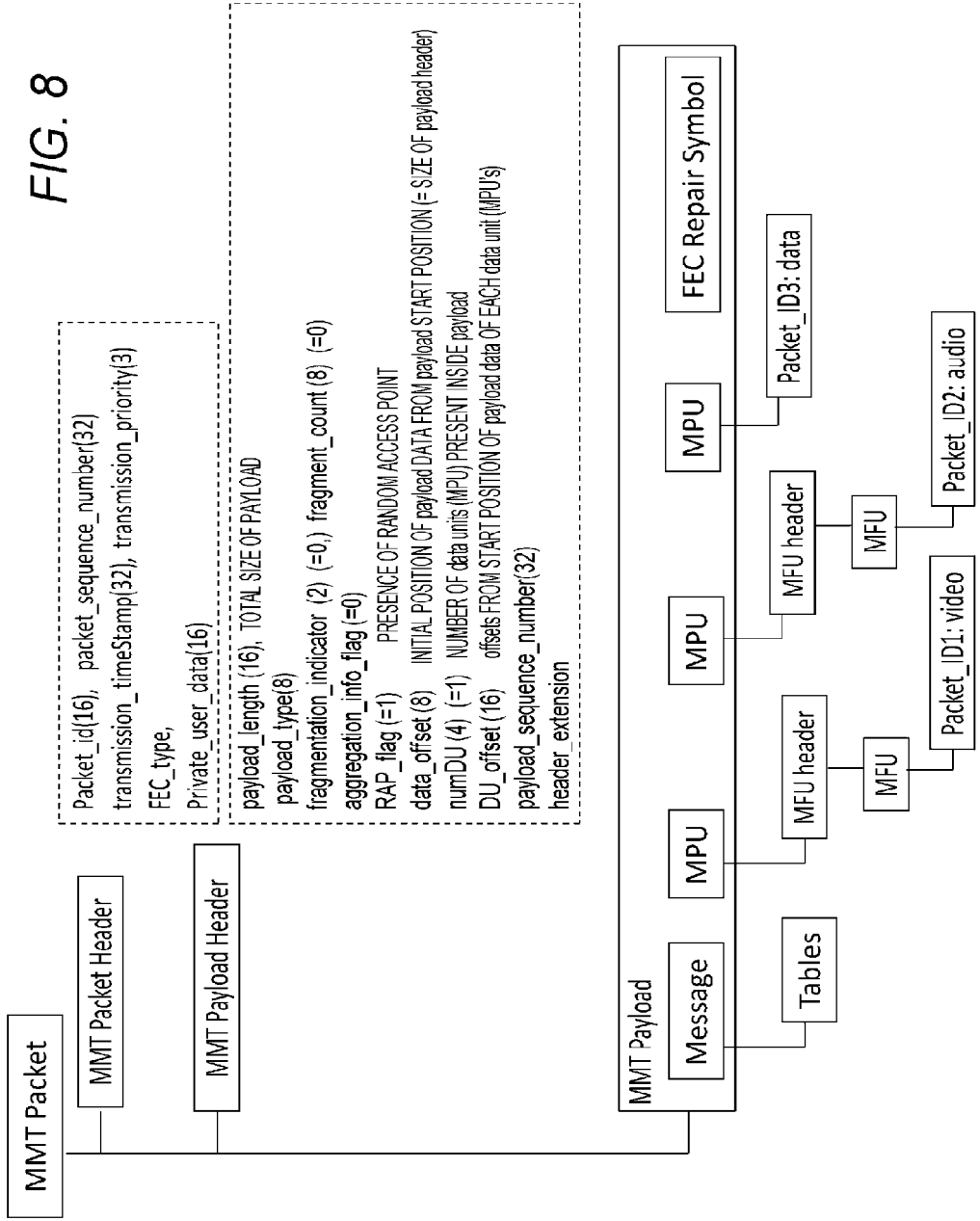
FIG. 8 is a diagram that illustrates the configuration of an MMT packet in a tree form.

In this embodiment, the multiplexed transport packet is assumed to be a transport packet having an MPEG media transport (MMT) structure (see ISO/IEC CD 23008-1), in other words, an MMT packet. FIG. 8 is a diagram that illustrates the configuration of an MMT packet in a tree form.

The MMT packet is configured by an MMT packet header, an MMT payload header, and an MMT payload. In the MMT payload, a message, a media processing unit (MPU), an FEC repair symbol, and the like are included, and such signaling is executed according to a payload type (payload_type) included in the MMT payload header.

Here, the message configures information relating to a transmission medium. In this message, various message contents are inserted in a table form. The MPU may be fragmented and subdivided into MMT fragment units (MFU). In such a case, an MFU header is added to the start of each MFU. In the MPU included in the MMT payload, an MPU relating to media data such as video, audio, and a subtitle and an MPU relating to metadata are present. The MMT packet including each MPU is identifiable by a packet ID (Packet ID) present in the MMT packet header.

Figure 9:
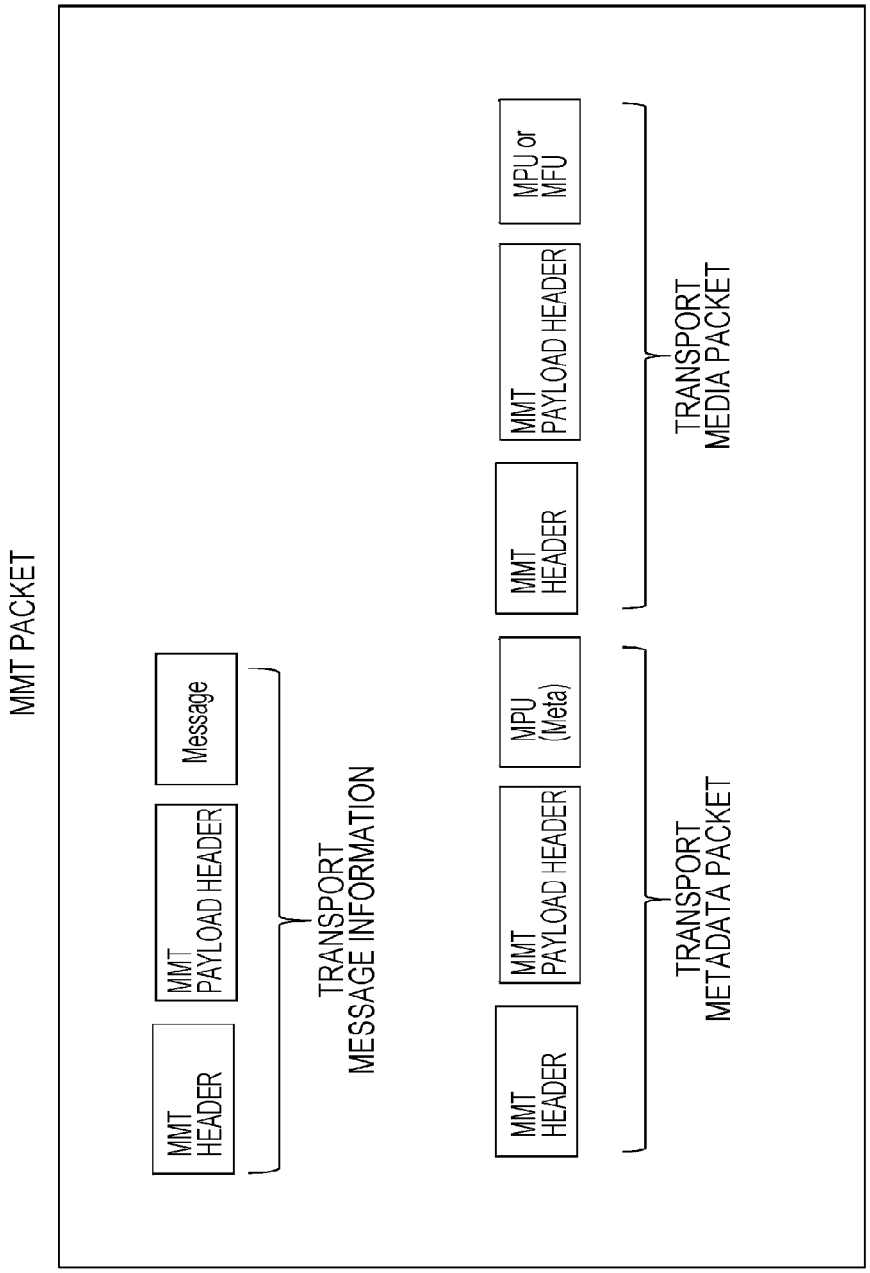
FIG. 9 is a diagram that illustrates the kinds of MMT packets.

FIG. 9 illustrates the kinds of MMT packet. In the example illustrated in the drawing, the MMT packets are classified based on data or information inserted into the payload. Here, transport message information is an MMT packet in which a message (information relating to a transmission medium) is included in the payload. A transport metadata packet is an MMT packet in which metadata is included in the payload. Here, the metadata, for example, is data of each of boxes of "styp", "sidx", "mmpu", "moov", and "moof" of an MMT file (MP4 file). A transport media data packet is an MMT packet in which media data such as video, audio, and a subtitle is included in the payload.

In the MMT payload header, flag information representing whether or not coded data of an intra picture that becomes a random access point is present in the MMT payload is arranged. FIG. 10 illustrates an example (Syntax) of the structure of an MMT payload header (mmtp_payload_header( )).

Although a detailed description will not be presented, in this MMT payload header, a payload length (payload_length), a payload type (payload_type), a fragment type (fragment_type), a fragment count (fragment_count), an aggregation information flag (aggregation_info_flag), a RAP flag (random_access_point_flag), a data offset (data_offset), a data unit number (numDU), a data unit offset (DU_offset), a payload sequence number (payload_seq_number), a header extension field flag (header_extension_field flag), and the like are included.

In addition, when the header extension field flag is "1", in this MMT payload header, an MMT payload header extension (mmtp_payload_header_extension( )) is further included. FIG. 11 illustrates an example (Syntax) of the syntax of the MMT payload header extension of such a case. This example (Syntax) of the structure corresponds to a case where time information (timing information) included in the MMT payload header is transmitted.

A 16-bit field of "payload_header_extension_type" represents the type of MMT payload header extension. For example, "0x01" represents that a display time stamp (display time) of an NTP short time format is supplied. "0x02" represents that a display time stamp and a decoding time stamp (decoding time) of the NTP short time format are supplied. "0x03" represents that a display time stamp of 90 KHz precision is supplied. "0x04" represents that a display time stamp and a decoding time stamp of 90 KHz precision are supplied.

A 16-bit field of "payload_header_extension_length" represents the size of the MMT payload header extension. A 32-bit field of "presentation_timestamp" represents the value of the display time stamp (display time). A 32-bit field of "decoding_timestamp" represents the value of the decoding time stamp (decoding time).

In this embodiment, in the broadcasting station 110, in the TLV packet, identification information used for identifying whether or not the packet is a packet handled with high priority is inserted, and identification information used for identifying whether or not the packet is a packet including access position information is inserted. In this sense, the broadcasting station 110 configures an information inserting unit that inserts identification information. FIG. 12 illustrates an example (Syntax) of the structure of a TLV packet (TLV packet( )). This TLV packet is configured by a TLV header (TLV_header) of 32 bits and a TLV payload (TLV_payload) having a variable length.

FIG. 13 illustrates an example (Syntax) of a more detailed structure of the TLV packet (TLV packet( )). A 32-bit TLV header (TLV_header) is configured by a two-bit field of "01", a one-bit field of "non_priority_bit1", a one-bit field of "non_priority_bit2", a one-bit field of "non_priority_bit3", a three-bit field of "reserved_future_use", an eight-bit field of "packet_type", and a 16-bit field of "length".

As the one-bit field of "non_priority_bit1", flag information representing whether or not the packet is a priority TLV type1 packet is newly defined. As illustrated in FIG. 14, "1" represents that the packet is a non-priority TLV packet, in other words, the packet does not include data in which the first byte (1st byte) of the access unit of a random access point starts. On the other hand, "0" represents that the packet is a priority TLV type1 packet, in other words, the packet includes data in which the first byte (1st byte) of the access unit of a random access point starts.

As the one-bit field of "non_priority_bit2", flag information representing whether or not the packet is a priority TLV type2 packet is newly defined. As illustrated in FIG. 14, "1" represents that the packet is a non-priority TLV packet, in other words, the packet includes neither the timing information nor a start portion of attribute information at the time of displaying a random access point. On the other hand, "0" represents that the packet is a priority TLV type2 packet, in other words, the packet includes timing information or a start portion of attribute information at the time of displaying a random access point.

As the one-bit field of "non_priority_bit3", flag information representing whether or not the packet is a priority TLV type3 packet is newly defined. As illustrated in FIG. 14, "1" represents that the packet is a non-priority TLV packet, in other words, the packet does not include a byte offset value toward a priority TLV packet. On the other hand, "0" represents that the packet is a priority TLV type3 packet, in other words, the packet includes a byte offset value toward a priority TLV packet.

In addition, a TLV packet set as a priority TLV packet does not have only a TLV packet including a transport media packet that is an MMT packet including media data such as video and audio as the target. A TLV packet including the transport message information or the MMT packet of the transport metadata packet is also set as a priority TLV packet as is necessary.

Referring back to FIG. 13, the eight-bit field of "packet_type" represents the packet type of the TLV packet (see FIG. 15). "0x01" represents that the packet includes an IPv4 packet. "0x02" represents that the packet includes an IPv6 packet. "0x03" represents that the packet includes a header-compressed IP packet. "0xFE" represents that the packet includes a transmission control signal. "0xFF" represents that the packet is a null packet. The 16-bit field of "length" represents the size of a variable-length TLV payload (TLV_payload) following the TLV header (TLV_header).

A TLV packet that is set such that "non_priority_bit1=0", "non_priority_bit2=1", and "non_priority_bit3=1" is a packet acquired by encapsulating an IP packet including a transport media packet (see FIG. 9) in the payload, and "packet_type" is "0x01", "0x02", or "0x03". Also in a TLV packet of which "packet_type" is "0x01", "0x02", or "0x03", in a case where data in which the first byte of the access unit of a random access point starts is not included therein, the bits are set such that "non_priority_bit1=1", "non_priority_bit2=1", and "non_priority_bit3=1".

A TLV packet set such that "non_priority_bit1=1", "non_priority_bit2=0", and "non_priority_bit3=1" is a packet acquired by encapsulating an IP packet including transport message information or a transport metadata packet (see FIG. 9) in the payload, and "packet_type" is "0x01", "0x02", or "0x03".

A TLV packet set such that "non_priority_bit1=1", "non_priority_bit2=1", and "non_priority_bit3=0" is a packet acquired by encapsulating access position information that is a transmission control signal, and "packet_type" is "0xFE". In such a case, in the payload of the TLV packet, a signaling packet (signaling packet) is arranged. FIG. 16 illustrates an example (Syntax) of the structure of the signaling packet, and FIG. 17 illustrates the content (Semantics) of major information of the example of the structure. Such a structure, for example, is a structure that matches the transmission control signal TLV_NIT.

A 16-bit field of "Pointer_previous TLV_priority packet" represents a byte offset value toward a previous priority packet (the reverse side). In addition, a 16-bit field of "Pointer_next TLV_priority packet" represents a byte offset value toward a next priority packet (the forward side).

Here, the priority packet is a TLV packet set such that "non_priority_bit1=0" or a TLV packet set such that "non_priority_bit2=0". In a case where a TLV packet set such that "non_priority_bit1=0" is independently present, the byte offset value is a byte offset value toward this TLV packet. On the other hand, in a case where a TLV packet set such that "non_priority_bit2=0" and a TLV packet set such that "non_priority_bit1=0" are continuously present in this order, the byte offset value is a byte offset value toward the TLV packet set such that "non_priority_bit2=0".

In a transmission stream (TLV packet stream) transmitted by the broadcasting station 110, as illustrated in FIG. 18(a), TLV packets (PCT PRO 1) each including an MMT packet that includes data in which the first byte of the access unit of a random access point starts are arranged at a predetermined interval. FIG. 19(a) schematically illustrates the structure of such a TLV packet (PCT PRO 1).

In this TLV packet (PCT PRO 1), "non_priority_bit1" is set to "0", and each of "non_priority_bit2" and "non_priority_bit3" is set to "1". In addition, in this TLV packet (PCT PRO 1) is a packet acquired by encapsulating an IP packet including a transport media packet (see FIG. 9) in the payload, and "packet_type" is "0x01", "0x02", or "0x03".

In addition, as illustrated in FIG. 18(a), immediately before the TLV packet (PCT PRO 1), there are cases where a TLV packet (PCT PRO 2) is present. Although not illustrated in the drawing, in this TLV packet (PCT PRO 2), "non_priority_bit2" is set to "0", and each of "non_priority_bit1" and "non_priority_bit3" is set to "1". In addition, this TLV packet (PCT PRO 2) is a packet acquired by encapsulating an IP packet including transport message information or a transport metadata packet (see FIG. 9) in the payload, and "packet_type" is "0x01", "0x02", or "0x03".

In addition, as illustrated in FIG. 18(a), immediately after the TLV packet (PCT PRO 1), a TLV packet (PCT PRO 3) is present. FIG. 19(b) schematically illustrates the structure of this TLV packet (PCT PRO 3). In this TLV packet (PCT PRO 3), "non_priority_bit3" is set to "0", and each of "non_priority_bit1" and "non_priority_bit2" is set to "1". In addition, this TLV packet (PCT PRO 3) is a packet acquired by encapsulating the access position information that is a transmission control signal, and "packet_type" is "0xFE".

In the payload of this TLV packet (PCT PRO 3), a signaling packet (signaling packet) (see FIG. 16) including fields of "Pointer_previous TLV_priority packet" and "Pointer_next TLV_priority packet" is included. As described above, "Pointer_previous TLV_priority packet" represents a byte offset value toward the previous priority packet (the reverse side), and "Pointer_next TLV_priority packet" represents a byte offset value toward the next priority packet (the forward side).

In addition, while the TLV packet is a packet acquired by encapsulating an IP packet including a transport media packet (see FIG. 9) in the payload, apparently, there are cases where the TLV packet does not include data in which the first byte of the access unit of a random access point starts. In FIG. 18(a), this TLV packet is illustrated simply as "PCT". FIG. 19(c) schematically illustrates the structure of this TLV packet (PCT).

In this TLV packet (PCT), all the "non_priority_bit1", "non_priority_bit2", and "non_priority_bit3" are set to "1". In addition, this TLV packet (PCT) is a packet acquired by encapsulating an IP packet including a transport metadata packet (see FIG. 9) in the payload, and "packet_type", similar to the TLV packet (PCT PRO 1) is "0x01", "0x02", or "0x03".

In this way, in the transmission stream transmitted by the broadcasting station 110, TLV packets (PCT PRO 1) are arranged to be identifiable at a predetermined interval, and the TLV packet (PCT PRO 3) including access position information is arranged following each TLV packet (PCT PRO 1). For this reason, on the reception side, in the trick reproduction such as fast forward reproduction or fast reverse reproduction after the storage of this transmission stream in a storage medium, data of the access unit of a random access point that is necessary for the trick reproduction can be efficiently acquired, and the trick reproduction can be executed at a high speed.

FIG. 18(b) illustrates an overview of fast forward reproduction corresponding to the transmission stream illustrated in FIG. 18(a). In this case, based on a user instruction for fast forward reproduction, first, from a TLV packet stream sequentially extracted from a storage medium, for example, a first TLV packet (PCT PRO 2) of a packet group of the TLV packet (PCT PRO 2), a TLV packet (PCT PRO 1), and a TLV packet (PCT PRO 3) of a period T1 is found out based on the identification information. For this TLV packet (PCT PRO 2), a header analysis is sequentially executed up to an upper layer, and information necessary for decoding the media data and the like are acquired.

Next, the TLV packet (PCT PRO 1) is extracted from the storage medium, a header analysis is sequentially executed up to an upper layer, and the media coded data is decoded, whereby media data (data of video and audio) including data of the first byte of the access unit of the random access point is acquired. Next, the TLV packet (PCT PRO 3) is extracted from the storage medium, and access position information (a byte offset value toward a previous priority packet and a byte offset value toward a next priority packet) is acquired.

Thereafter, until data of access units corresponding to a required number is acquired, TLV packets (PCT) are sequentially extracted from the storage medium, a header analysis is sequentially executed up to an upper layer, and media coded data is decoded. Here, the access units corresponding to a required number may be configured by only access units of I pictures of random access points, or access units of a B picture or a P picture following them may be further included. While the number of the access units is determined by a reproduction application, it relates to the speed of fast forward reproduction.

Next, based on the access position information (the byte offset value toward the next priority packet) acquired from the TLV packet (PCT PRO 3), a first TLV packet (PCT PRO 1) of a packet group of the TLV packet (PCT PRO 1) and a TLV packet (PCT PRO 3) of a period T2 is extracted from the storage medium. Then, for this TLV packet (PCT PRO 1), a header analysis is executed up to an upper layer, and the media coded data is decoded, whereby media data (data of video and audio) including data of the first byte of the access unit of a random access point is acquired.

Next, the TLV packet (PCT PRO 3) is extracted from the storage medium, and access position information (a byte offset value toward a previous priority packet and a byte offset value toward a next priority packet) is acquired. Thereafter, until data of access units corresponding to a required number is acquired, TLV packets (PCT) are sequentially extracted from the storage medium, a header analysis is sequentially executed up to an upper layer, and media coded data is decoded.

Next, based on the access position information (the byte offset value toward the next priority packet) acquired from the TLV packet (PCT PRO 3), a first TLV packet (PCT PRO 2) of a packet group of the TLV packet (PCT PRO 2), a TLV packet (PCT PRO 1), and a TLV packet (PCT PRO 3) of a period T3 is extracted from the storage medium. Thereafter, the process is similarly repeated, whereby the fast forward reproduction is executed.

FIG. 18(c) illustrates an overview of fast reverse reproduction corresponding to the transmission stream illustrated in FIG. 18(a). In this case, based on a user instruction for fast reverse reproduction, first, from a TLV packet stream sequentially extracted from a storage medium, for example, a first TLV packet (PCT PRO 2) of a packet group of the TLV packet (PCT PRO 2), a TLV packet (PCT PRO 1), and a TLV packet (PCT PRO 3) of a period T3 is found out based on the identification information. For this TLV packet (PCT PRO 2), a header analysis is sequentially executed up to an upper layer, and information necessary for decoding the media data and the like are acquired.

Next, the TLV packet (PCT PRO 1) is extracted from the storage medium, a header analysis is sequentially executed up to an upper layer, and the media coded data is decoded, whereby media data (data of video and audio) including data of the first byte of the access unit of the random access point is acquired. Next, the TLV packet (PCT PRO 3) is extracted from the storage medium, and access position information (a byte offset value toward a previous priority packet and a byte offset value toward a next priority packet) is acquired. Thereafter, until data of access units corresponding to a required number is acquired, TLV packets (PCT) are sequentially extracted from the storage medium, a header analysis is sequentially executed up to an upper layer, and media coded data is decoded.

Next, based on the access position information (the byte offset value toward the previous priority packet) acquired from the TLV packet (PCT PRO 3), a first TLV packet (PCT PRO 1) of a packet group of the TLV packet (PCT PRO 1) and a TLV packet (PCT PRO 3) of a period T2 is extracted from the storage medium. Then, for this TLV packet (PCT PRO 1), a header analysis is executed up to an upper layer, and the media coded data is decoded, whereby media data (data of video and audio) including data of the first byte of the access unit of a random access point is acquired.

Next, the TLV packet (PCT PRO 3) is extracted from the storage medium, and access position information (a byte offset value toward a previous priority packet and a byte offset value toward a next priority packet) is acquired. Thereafter, until data of access units corresponding to a required number is acquired, TLV packets (PCT) are sequentially extracted from the storage medium, a header analysis is sequentially executed up to an upper layer, and media coded data is decoded.

Next, based on the access position information (the byte offset value toward the previous priority packet) acquired from the TLV packet (PCT PRO 3), a first TLV packet (PCT PRO 2) of a packet group of the TLV packet (PCT PRO 2), a TLV packet (PCT PRO 1), and a TLV packet (PCT PRO 3) of a period T1 is extracted from the storage medium. Thereafter, the process is similarly repeated, whereby the fast reverse reproduction is executed. In addition, in this reverse reproduction, while data of a predetermined number of access units in a forward direction is acquired in each period, data of the access units is aligned and used in a reverse direction at the time of display.

Figure 20:
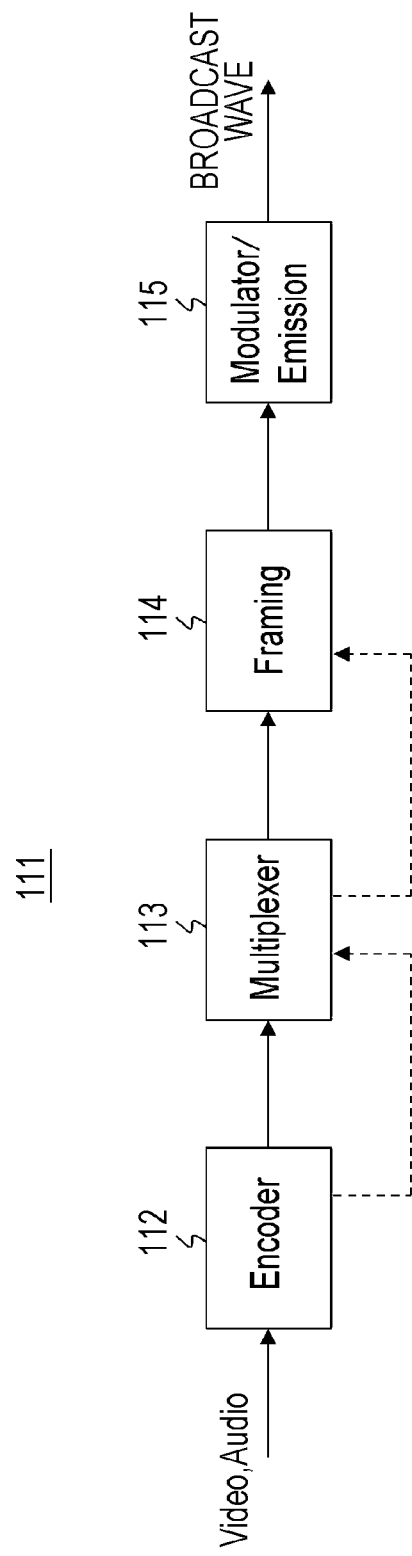
FIG. 20 is a diagram that illustrates an example of a transmission system of a broadcast wave in a broadcasting station.

FIG. 20 is a diagram that illustrates an example of a transmission system 111 of a broadcast wave in the broadcasting station 110. This transmission system 111 includes: an encoder unit 112; a multiplexer unit 113; a framing unit 114; and a modulator/emission unit 115. The encoder unit 112 codes media data such as video, audio, and the like, thereby acquiring coded data. For example, for video data, coding such as MPEG4-AVC, high efficiency video coding (HEVC), or the like is executed.

In addition, the encoder unit 112 packetizes coded data of video, audio, or the like, thereby generating a multiplexed transport packet for each medium. As described above, in this embodiment, the multiplexed transport packet, for example, is assumed to be an MMT packet. In addition, in an MMT packet that is actually transmitted, as described above, in addition to a transport media packet including media data such as video and audio in the payload, transport message information and a transport metadata packet are also present (see FIG. 9).

Furthermore, the encoder unit 112 packetizes the multiplexed transport packet into a UDP or a TCP and adds an IP header thereto, thereby generating an IP packet including the multiplexed transport packet. The encoder unit 112 transmits each IP packet to the multiplexer unit 113. The multiplexer unit 113 multiplexes such IP packets.

In addition, the multiplexer unit 113 determines whether or not data of the first byte of an access unit (intra picture) configuring a random access point is included based on the IP packet including the coded data of video, audio, and the like. Alternatively, when an IP packet including the coded data of video, audio, and the like is supplied from the encoder unit 112, as denoted by a broken line, the multiplexer unit 113 is simultaneously supplied also with information of an access unit (intra picture) configuring a random access point.

Furthermore, the multiplexer unit 113 supplies a multiplexed stream of IP packets to the framing unit 114. At this time, as denoted by a broken line, the multiplexer unit 113 also supplies information on whether or not the data of the first byte of the access unit (intra picture) configuring the random access point is included to the framing unit 114 in correspondence with the supply of the IP packet including the coded data of video, audio, and the like.

The framing unit 114 generates a TLV packet acquired by encapsulating the multiplexed IP packet. In addition, the framing unit 114 generates a TLV packet acquired by encapsulating transmission control signals (TLV-NIT and AMT). At the time of executing the encapsulating process, the framing unit 114 sets priority packet identification information included in the TLV header, in other words, setting of the one-bit field of "non_priority_bit1", the one-bit field of "non_priority_bit2", and the one-bit field of "non_priority_bit3" is executed (FIGS. 13 and 14).

The framing unit 114 sets the one-bit field of "non_priority_bit1" to "0" when the data in which the first byte of the access unit of the random access point starts is included in the TLV packet so as to present a priority TLV type1 packet. In addition, the framing unit 114 sets the one-bit field of "non_priority_bit2" to "0" when the timing information or the start portion of the attribute information at the time of displaying the random access point is included so as to represent a priority TLV type2 packet. Furthermore, the framing unit 114 sets the one-bit field of "non_priority_bit3" to "0" when a byte offset value toward the priority TLV packet is included so as to represent a priority TLV type3 packet.

In addition, the framing unit 114 executes a framing process in which each TLV packet is stored in a slot of the transmission frame. The framing unit 114 supplies the generated transmission frame to the modulator/emission unit 115. The modulator/emission unit 115 executes an RF modulation process for the transmission frame so as to generate a broadcast wave and transmits the broadcast wave to the reception side through an RF transmission channel.

Referring back to FIG. 1, the distribution server 120, for example, distributes a transmission stream in which IP packets as transmission packets each including an MMT packet as handled by the broadcasting station 110 described above are continuously arranged to the reception side through a communication network 300 through multicast. Alternatively, the distribution server 120, based on a reproduction command transmitted from the reception side, transmits a transmission stream, in which predetermined IP packets as transmission packets each including an MMT packet are continuously arranged, in accordance with the reproduction mode to the reception side through the communication network 300 as an on-demand video service. In the reproduction mode, in addition to a normal reproduction mode, trick reproduction such as fast forward reproduction and fast reverse reproduction is included.

Figure 21:
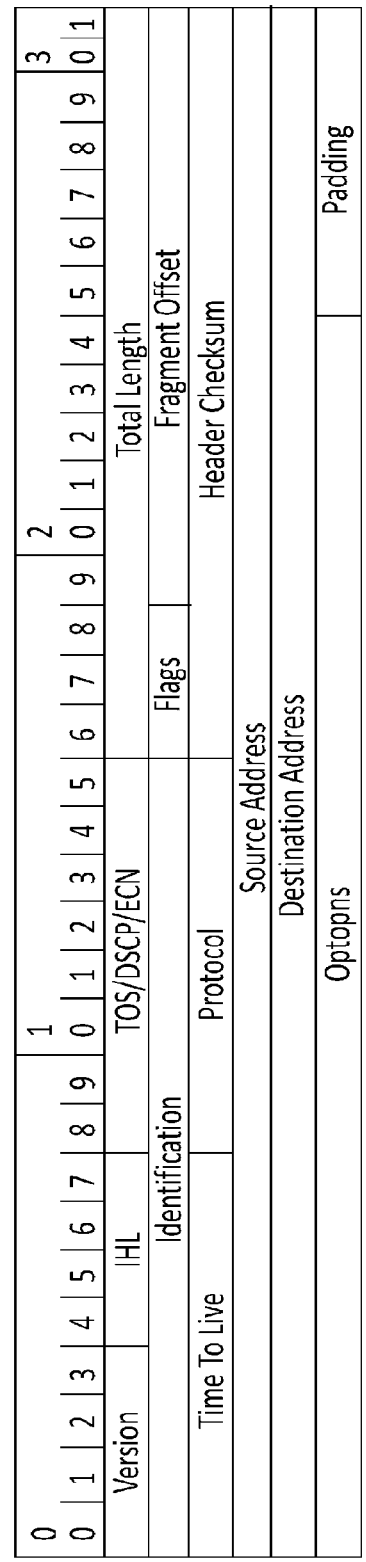
FIG. 21 is a diagram that illustrates an example of the structure of an internet protocol (IP) header.

In this embodiment, in the IP packet as the transmission packet stored in the distribution server 120, the identification information used for identifying whether or not the packet is a packet handled with high priority is inserted, and identification information used for identifying whether or not the packet is a packet including the access position information is inserted. FIG. 21 illustrates an example (Syntax) of the structure of an internet protocol (IP) header. FIG. 22 illustrates contents (Semantics) of major information of the example of the structure.

A four-bit field of "Version" represents the version of the IP header. A four-bit field of "IHL=Hdr Len" represents the length of the IP header in units of 32 bits. In a case where there is no option, the length of the IP header is 20 bytes. An eight-bit field of "TOS/DSCP/ECN" is a service type field. A 16-bit field of "Total Length" represents the total length of the IP packet in the number of bytes.

A first bit of a three-bit field of "Flags" is unused. A second bit designates whether or not fragmentation is permitted. In addition, in the case of fragmentation, a third bit represents whether or not the fragment is in the middle or at the end of the original IP packet. A 13-bit field of "Fragment Offset", in a case where an IP packet is fragmented, represents the position indicating the sequence of the fragment.

An eight-bit field of "Time To Live" represents a maximal period during which the IP packet can live on the Internet. The purpose thereof is to prevent an IP packet having a destination that is not found from continuing to be circulated on the network. An eight-bit field of "Protocol" is an identifier used for identifying a high-order protocol. For example, "1" represents "ICMP", "2" represents "IGMP", "3" represents "TCP", "17" represents "UDP", "41" represents "IPv6", and "89" represents "OSPF".

A 16-bit field of "Header Checksum" is a CRC used for checking the IP header. A 32-bit field of "Source Address" represents the IP address of a transmission source. A 32-bit field of "Destination Address" represents the IP service of a destination.

FIG. 23 illustrates an example (Syntax) of the structure of "Options". FIG. 24 illustrates contents (Semantics) of major information of the example of the structure. A one-bit field of "type_copy" represents that copy is executed within a first fragment when "type_copy" has a value "1". When "type_copy" has a value "0", it represents that copy is executed over all the fragments. "type_class" represents the type of application target. A five-bit field of "type_number" represents a type number. For example, "01111" will be newly defined as a type number that represents media access priority information. In addition, for example, "01110" will be newly defined as a type number that represents a media access offset position. An eight-bit field of "length" represents a size after that in number of bytes.

For example, as illustrated in FIG. 25, by setting "type_number='01111'" and "length=2", for example, information used for identifying whether or not a first byte of the access unit of a random access point is included and the like are defined. In "information" of two bytes at that time, "0x0001" represents that the first byte (1st byte) of the access unit of the random access point is included. On the other hand, "0x0002" represents that the timing information or the start portion of the attribute information at the time of displaying a random access point is included. In addition, "0x0000" represents that the other information is included.

As illustrated in FIG. 26, by setting "type_number='01110'" and "length=4", for example, information for supplying a random access point or a packet position for special reproduction is defined. In "information" of four bytes at that time, following "Media Access offset position forward (16 bits)", "Media Access offset position backward (16 bits)" is transmitted.

Here, "Media Access offset position backward (16 bits)", similar to the 16-bit field of "Pointer_previous TLV_priority packet" included in the signaling packet (signaling) (see FIG. 16) described above, represents a byte offset value toward a previous priority packet (the reverse side). In addition, "Media Access offset position forward (16 bits)", similar to the 16-bit field of "Pointer_next TLV_priority packet" included in the signaling packet described above, represents a byte offset value toward a next priority packet (the forward side).

In the transmission stream (IP packet stream) transmitted by the distribution server, as illustrated in FIG. 27(a), IP packets (PCT PRO 1) each including a transport media packet (see FIG. 9) that includes data, in which a first byte of the access unit of the random access point starts, are arranged at a predetermined interval. In this IP packet (PCT PRO 1), by setting "type_number='01111'" and "length=2", "information" of the two bytes is set to "0x0001".

In addition, as illustrated in FIG. 27(a), immediately before the IP packet (PCT PRO 1), there are cases where the IP packet (PCT PRO 2) is present. This IP packet (PCT PRO 2) is an IP packet including transport message information or a transport metadata packet (see FIG. 9). This IP packet (PCT PRO 2) is set such that "type_number='01111'" and "length=2", and "information" of the two bytes is "0x0002".

As illustrated in FIG. 27(a), immediately after the IP packet (PCT PRO 1), an IP packet (PCT PRO 3) is present. This IP packet (PCT PRO 3) is an IP packet that includes access position information. In this IP packet (PCT PRO 3), "type_number='01110'", and "length=4", and "Media Access offset position forward (16 bits)" and "Media Access offset position backward (16 bits)" are arranged in "information" of four bytes.

In addition, while the IP packet is a packet including a transport media packet (see FIG. 9) in the payload, apparently, there are cases where the IP packet does not include data in which the first byte of the access unit of a random access point starts. In FIG. 27(a), this IP packet is illustrated simply as "PCT".

In this way, in the transmission stream transmitted by the distribution server 120, IP packets (PCT PRO 1) are arranged to be identifiable at a predetermined interval, and the IP packet (PCT PRO 3) including access position information is arranged following each IP packet (PCT PRO 1). For this reason, on the reception side, for example, in the trick reproduction such as fast forward reproduction or fast reverse reproduction after the storage of this transmission stream in a storage medium, data of the access unit of a random access point that is necessary for the trick reproduction can be efficiently acquired, and the trick reproduction can be executed at a high speed.

FIG. 27(b) illustrates an overview of fast forward reproduction corresponding to the transmission stream illustrated in FIG. 27(a). In addition, FIG. 27(c) illustrates an overview of fast reverse reproduction corresponding to the transmission stream illustrated in FIG. 27(a). While detailed description thereof will not be presented, the reproduction is similar to the overview of the reproduction of the case of the TLV packet stream illustrated in FIGS. 18(b) and 18(c).

Referring back to FIG. 1, the receiver 200: includes a tuner 201; a demultiplexer 202, a decoder 203; a display 204; a gateway/network router 205; a central processing unit (CPU) 206; and a user operation unit 207.

The CPU 206 controls the operation of each unit of the receiver 200. A user can execute various inputs by using the user operation unit 207. This user operation unit 207 is a remote control unit, a touch panel unit that executes an instruction input through an approach/touch, a mouse, a keyboard, a gesture input unit that detects an instruction input by using a camera, an audio input unit that gives an instruction by using audio, or the like. The user can execute an instruction input such as fast forward reproduction or fast reverse reproduction by using the user operation unit 207.

The tuner 201 and the gateway/network router 205 configure an acquisition unit or a reception unit. The tuner 201 receives a broadcast wave transmitted through the RF transmission channel from the transmission side, acquires a transmission frame by executing RF demodulation, executing a deframing process and decapsulation, and outputs an IP packet. In addition, the tuner 201 supplies transmission control signals (TLV-NIT and AMT) acquired by decapsulation of the TLV packet to a CPU (control unit) 206 not illustrated in the diagram. In these control signals, the access position information used at the time of executing trick reproduction such as fast forward reproduction or fast reverse reproduction is also included.

In addition, a storage medium 210 located outside the receiver 200, for example, an HDD is connected to the tuner 201, and the transmission stream acquired by the tuner 201 can be recorded and reproduced. At the time of reproduction, the tuner 201 transmits a reproduction command to the storage medium 210, receives a transmission stream reproduced from the storage medium 210, executes decapsulation thereof, and outputs an IP packet. In such a case, in accordance with a reproduction mode represented in the reproduction command, the trick reproduction such as the fast forward reproduction or the fast reverse reproduction can be executed in additional to normal reproduction.

The tuner 201 supplies the output IP packet to the demultiplexer 202. At this time, the tuner 201 also supplies the priority packet identification information extracted from the header of the TLV packet to the demultiplexer 202 in correspondence with the supply of each IP packet. The demultiplexer 202 executes an extraction process for each type (video, audio, metadata, a message, or the like) of data included in the payload for the IP packets supplied from the tuner 201. The demultiplexer 202 supplies the extracted IP packet of each type to the corresponding decoder 203 together with the priority packet identification information.

The decoder 203 executes a de-packetizing process and a decoding process as is necessary for the IP packets for each type. The decoder 203 supplies a message and metadata to a control unit not illustrated in the diagram. In addition, the decoder 203 supplies video data to the display 204 as a display unit and supplies audio data to an audio output unit not illustrated in the diagram, for example, a speaker.

FIG. 28 illustrates an example of a reception/reproduction system 211 of the receiver 200. This reception/reproduction system 211 includes: a tuner/demodulator unit 212; a deframing unit 213; a demultiplexer unit 214; a decoder unit 215; and a media interface 216. The tuner/demodulator unit 212 receives a broadcast wave through the RF transmission channel and executes an RF demodulation process thereof, thereby acquiring a transmission frame in which a TLV packet is included in the transmission slot. The tuner/demodulator unit 212 supplies the transmission frame to the deframing unit 213.

The deframing unit 213 extracts a TLV packet included in each slot from the transmission frame. In addition, the deframing unit 213 executes a decapsulation process for each extracted TLV packet, thereby acquiring an IP packet and transmission control signals (TLV-NIT and AMT).

The deframing unit 213 supplies the acquired transmission control signals to the CPU 206. In addition, the deframing unit 213 supplies the acquired IP packet to the demultiplexer 214. At this time, the deframing unit 213, as denoted by a broken line, also supplies the priority packet identification information included in the TLV header to the demultiplexer unit 214 in correspondence with the supply of each IP packet. This priority packet identification information, as described above, is information of the one-bit field of "non_priority_bit1" and the one-bit field of "non_priority_bit2" (see FIG. 13).

The demultiplexer unit 214 executes the process of extracting the IP packets supplied from the deframing unit 213 for each type of data included in the payload. The demultiplexer unit 214 supplies the extracted IP packet of each type to the corresponding decoder unit 215. At this time, the demultiplexer unit 214, as denoted by a broken line, also supplies the priority packet identification information to the decoder unit 215 in correspondence with the supply of each IP packet.

The decoder unit 215 executes a de-packetizing process and a decoding process as is necessary for the IP packets for each type. The decoder unit 215 supplies a message and metadata to a control unit not illustrated in the drawing. In addition, the decoder unit 215 supplies video data to a display unit not illustrated in the drawing and supplies audio data to an audio output unit not illustrated in the drawing.

The media interface 216, under the control of the CPU 206, executes recording of the transmission stream (TLV packet stream) for the storage medium 210 and reproduction of the transmission stream (TLV packet stream) supplied from the storage medium 210. The media interface 216 transmits the transmission stream (TLV packet stream) acquired by the deframing unit 213 to the storage medium 210 so as to be stored (recorded) therein at the time of recording.

The media interface 216 accesses the storage medium 210, extracts a stored transmission stream (TLV packet stream), and transmits the transmission stream to the deframing unit 213 at the time of reproduction. The deframing unit 213 executes a decapsulation process for each TLV packet of the extracted transmission stream (TLV packet stream), thereby acquiring an IP packet and transmission control signals (TLV-NIT and AMT).

The time of the reproduction, the deframing unit 213 supplies the transmission control signals (TLV-NIT and AMT) acquired through the decapsulation process to the CPU 206. In these control signals, the access position information ("Pointer_previous TLV_priority packet", "Pointer_next TLV_priority packet") included in the TLV packet (PCT PRO 3) are also included. In addition, the deframing unit 213 also supplies the identification information ("non_priority_bit1", "non_priority_bit2", and "non_priority_bit3") of the TLV packet acquired through the decapsulation process to the CPU 206. In addition, at the time of the reproduction, the decoder 215 supplies decoding information to the CPU 206.

The CPU 206 controls accesses to the storage medium 210 from the media interface 216 based on various kinds of information supplied as described above. In this way, the media interface 216, in trick reproduction such as the fast forward reproduction and the fast reverse reproduction, can efficiently extract a TLV packet including data of the access unit that is necessary for the trick reproduction from the storage medium 210.

Referring back to FIG. 1, the gateway/network router unit 205 receives a transmission stream of a service distributed through multicast from the distribution server 120 through the communication network 300 and outputs an IP packet similar to the output of the tuner 201 described above. In addition, in the header of this IP packet, the identification information used for identifying whether or not the packet is a packet to be handled with high priority is inserted, and the identification information used for identifying whether or not the packet is a packet including the access position information is inserted (see FIGS. 23 to 26).

In addition, a storage medium 220 located outside the receiver 200, for example, an HDD is connected to the gateway/network router unit 205 through a local network, and the transmission stream received by the gateway/network router unit 205 can be recorded and reproduced. At the time of reproduction, the gateway/network router unit 205 transmits a reproduction command to the storage medium 220, receives a transmission stream (IP packet stream) reproduced from the storage medium 220, and outputs an IP packet configuring the transmission frame. In such a case, in accordance with a reproduction mode directed by the reproduction command, the trick reproduction such as the fast forward reproduction or the fast reverse reproduction can be executed in additional to normal reproduction.

At the time of the reproduction, the identification information used for identifying whether or not the packet is a packet to be handled with high priority, the identification information used for identifying whether or not the packet is a packet including the access position information, and the access position information ("Media Access offset position forward" and "Media Access offset position backward"), which are inserted in the IP packet, are supplied to the CPU 206. In addition, at this time of the reproduction, decoding information is supplied from the decoder 215 to the CPU 206.

The CPU 206, similar to the process executed at the time of reproduction of the transmission stream (TLV packet stream) of the broadcasting system described above, controls accesses to the storage medium 220 based on supplied various kinds of information. In this way, in trick reproduction such as the fast forward reproduction or the fast reverse reproduction, an IP packet including data of the access unit that is necessary for the trick reproduction can be efficiently extracted from the storage medium 220.

Alternatively, the gateway/network router unit 205 transmits a reproduction command to the distribution server 120, receives a transmission stream of an on-demand video service from the distribution server 120 through the communication network 300, and outputs an IP packet similar to that of the case of the multicast distribution described above. In such a case, the transmission stream transmitted from the distribution server 120 corresponds to the reproduction mode represented in the reproduction command. In the reproduction mode, in addition to a normal reproduction mode, trick reproduction such as fast forward reproduction and fast reverse reproduction is included.

The CPU 206 can execute access control for the distribution server 120 through the gateway/network router unit 205 similar to the access control for the storage medium 220 described above. In this way, in trick reproduction such as the fast forward reproduction or the fast reverse reproduction, an IP packet including data of the access unit that is necessary for the trick reproduction can be efficiently extracted from the distribution server 120.

The gateway/network router unit 205 supplies the output IP packet to the demultiplexer 202. The demultiplexer 202 executes an extraction process for each type (video, audio, metadata, a message, or the like) of data included in the payload for the IP packets supplied from the gateway/network router unit 205. The demultiplexer 202 supplies the extracted IP packet of each type to the corresponding decoder 203.

The decoder 203 executes a de-packetizing process and a decoding process as is necessary for the IP packets for each type. The decoder 203 supplies a message and metadata to the CPU (control unit) 206. In addition, the decoder 203 supplies video data to the display 204 as a display unit and supplies audio data to an audio output unit not illustrated in the diagram, for example, a speaker.

The operation of the display system 10 illustrated in FIG. 1 will be briefly described. First, a case will be described in which the tuner 201 of the receiver 200 receives a broadcast wave from the broadcasting station 110 and executes the process. In such a case, a broadcast wave carrying a transmission stream in which TLV packets as transmission packets are continuously arranged is transmitted from the broadcasting station 110 to the reception side through the RF transmission channel. This broadcast wave is received by the tuner 201 of the receiver 200.

The tuner 201 acquires a transmission frame by executing the RF demodulation process for the received broadcast wave, executes the deframing process and decapsulation, and outputs an IP packet. Here, the transmission control signals (TLV-NIT and AMT) acquired by decapsulation of the TLV packet are supplied to the CPU 206.

The IP packet output from the tuner 201 is supplied to the demultiplexer 202. At this time, priority packet identification information extracted from the header of the TLV packet is also supplied from the tuner 201 to the demultiplexer 202 in correspondence with the supply of each IP packet. The demultiplexer 202 executes an extraction process for each type (video, audio, metadata, a message, or the like) of data included in the payload for the IP packets sequentially supplied from the tuner 201.

The IP packets of each type extracted by the demultiplexer 202 are supplied to the corresponding decoder 203 together with the priority packet identification information. The decoder 203 executes a de-packetizing process and a decoding process as is necessary for the IP packets for each type. Here, video data acquired by the decoder 203 is supplied to the display 204 as a display unit, and an image is displayed. In addition, audio data acquired by the decoder 203 is supplied to an audio output unit not illustrated in the diagram, for example, a speaker, and audio is output. Furthermore, a message and metadata acquired by the decoder 203 are supplied to the CPU 206.

Here, an operation executed in a case where channel switching (random access) of broadcasting occurs according to a user operation will be described. In this case, in the receiver 200, the target for a display process is started from a first random access point (RAP) of a transmission stream after the channel switching. As this random access point, the start of the access unit configured only by non-predictive components (an I picture and an IDR picture) or a start point of message information relating thereto is the target.

Figure 29:
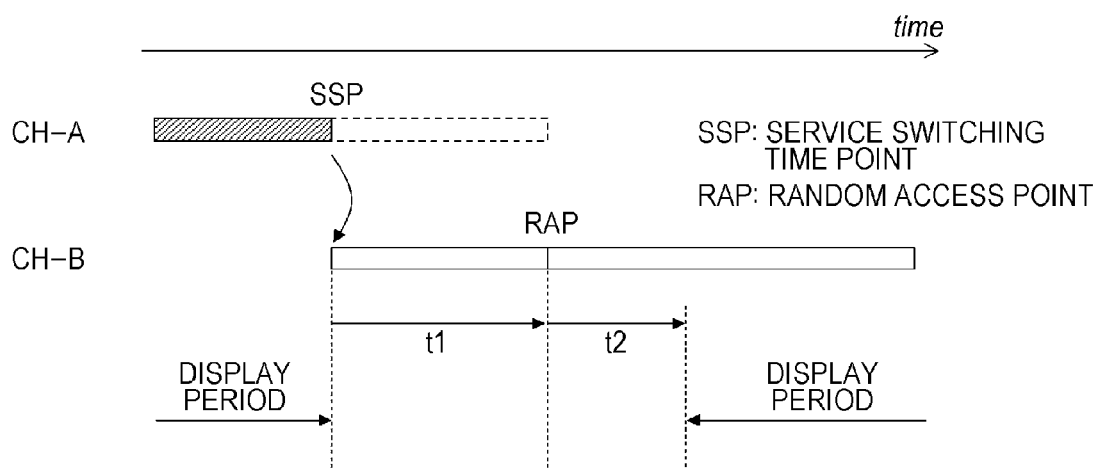
FIG. 29 is a diagram that illustrates a display delay at the time of execution of switching between channels (at the time of executing a random access).

FIG. 29 illustrates an example of a case where switching is made from channel A (CH-A) to channel B (CH-B) at a service switching time point SSP. In this case, when the display is restarted, at least a delay t1 from the time point SSP to a time point RAP occurs. In addition, in a case where a predictive differential picture (a P picture or a B picture) referring to a picture positioned before an I picture in the display order is present after the time point RAP, a delay t2 caused thereby occurs as well.

According to this embodiment, based on the priority packet identification information included in the header of the TLV packet, an analysis process of the header of each packet in the transmission stream up to a first random access point (RAP) is omitted appropriately, and a delay until decoding/displaying of a picture of the first random access point decreases, whereby a response time until initial display is shortened.

Next, an operation will be described which is executed in a case where a reproduction command is transmitted to the storage medium 210 according to a user operation, and trick reproduction such as fast forward reproduction or fast reverse reproduction is executed. In such a case, accesses to the storage medium 210 are controlled by the CPU 206, and, for example, a TLV packet including the access unit of the random access point (RAP) is selectively extracted, and a transmission stream including the TLV packet is returned to the tuner 201 as a reproduction transmission stream.

The tuner 201 executes decapsulation of the TLV packet included in the transmission stream supplied from the storage medium 210 and outputs an IP packet. Here, transmission control signals (TLV-NIT and AMT) acquired through the decapsulation of the TLV packet are supplied to the CPU 206.

The IP packet output from the tuner 201 is supplied to the demultiplexer 202. The demultiplexer 202 executes the extraction process for each type (video or audio) of data included in the payload for the IP packets sequentially supplied from the tuner 201. The IP packets of each type extracted by the demultiplexer 202 are supplied to the corresponding decoder 203 together with the priority packet identification information.

The decoder 203 executes the de-packetizing process and the decoding process for the IP packets for each type. Here, video data acquired by the decoder 203 is supplied to the display 204 as a display unit, and accordingly, an image of the trick reproduction is displayed. In addition, audio data acquired by the decoder 203 is supplied to an audio output unit not illustrated in the diagram, for example, a speaker, and accordingly, audio corresponding to the display image is output.

Figure 30:
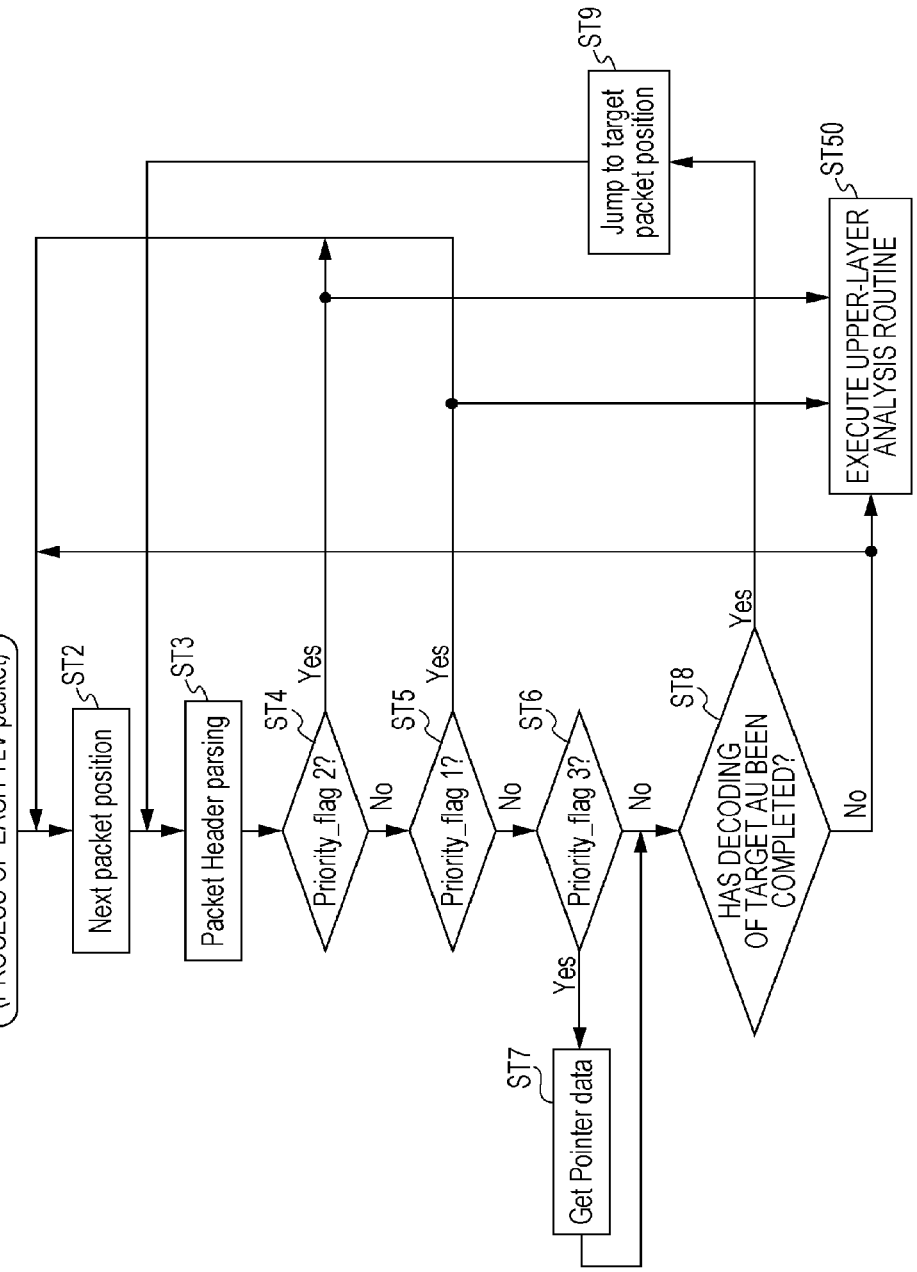
FIG. 30 is a flowchart that illustrates an example of the process of a receiver of a case where a transition is made from a normal reproduction mode to a mode of trick reproduction (fast forward reproduction or fast reverse reproduction).

FIG. 30 illustrates an example of the process of the receiver 200 of a case where a transition is made from a normal reproduction mode to a mode of trick reproduction (fast forward reproduction or fast reverse reproduction) in accordance with a user operation. The receiver 200 starts the process in Step ST1 in accordance with the transition to the trick reproduction mode and thereafter causes the process to proceed to the process of Step ST2. In this Step ST2, the receiver 200 accesses a storage position of a next TLV packet in the storage medium 210 and acquires the TLV packet.

Next, in Step ST3, the receiver 200 analyzes the header of the acquired TLV packet and recognizes the settings of "non_priority_bit1", "non_priority_bit2", and "non_priority_bit3". Then, in Step ST4, the receiver 200 determines whether or not "non_priority_bit2" is set to "0". When "non_priority_bit2" is set to "0", the receiver 200 causes the process to proceed to Step ST50 and executes the process of an upper-layer analysis routine and, in parallel, returns the process to Step ST2 and executes the process of acquiring a next TLV packet from the storage medium 210.

In a case where "non_priority_bit2" is not set to "0" in Step ST4, the receiver 200 determines whether or not "non_priority_bit1" is set to "0" in Step ST5. When "non_priority_bit1" is set to "0", the receiver 200 causes the process to proceed to Step ST50 and executes the upper-layer analysis routine and, in parallel, returns the process to Step ST2 and executes the process of acquiring a next TLV packet from the storage medium 210.

When "non_priority_bit1" is not set to "0" in Step ST5, the receiver 200 determines whether or not "non_priority_bit3" is set to "0" in Step ST6. When "non_priority_bit3" is set to "0", the receiver 200, in Step ST7, acquires the access position information from the TLV packet and, thereafter, in Step ST8, determines whether or not the decoding process for the target access unit has been completed. This determination is executed based on decoding status information of the target access unit supplied from the decoder 203. As the target access units, a case where only access units of I pictures of the random access point are included or a case where access units of I pictures and a predetermined number of access units of B pictures and P pictures after that are included may be considered.

In a case where "non_priority_bit3" is not set to "0" in Step ST6, the receiver 200 determines whether or not the decoding process for the target access unit has been completed in Step ST8. This determination is executed based on the decoding status information of the target access unit supplied from the decoder 203. As the target access units, a case where only access units of I pictures of the random access point are included or a case where access units of I pictures and a predetermined number of access units of B pictures and P pictures after that are included may be considered.

When the decoding process for the target access unit has been completed, the receiver 200, in Step ST9, accesses the storage position of a jumped TLV packet in the storage medium 210 based on the access position information acquired in Step ST7 described above, acquires the TLV packet and, thereafter, returns the process to Step ST3. On the other hand, when the decoding process for the target access unit has not been completed, the receiver 200 causes the process to proceed to Step ST50 and executes the upper-layer analysis routine and, in parallel, returns the process to Step ST2 and executes the process of acquiring a next TLV packet from the storage medium 210.

Figure 31:
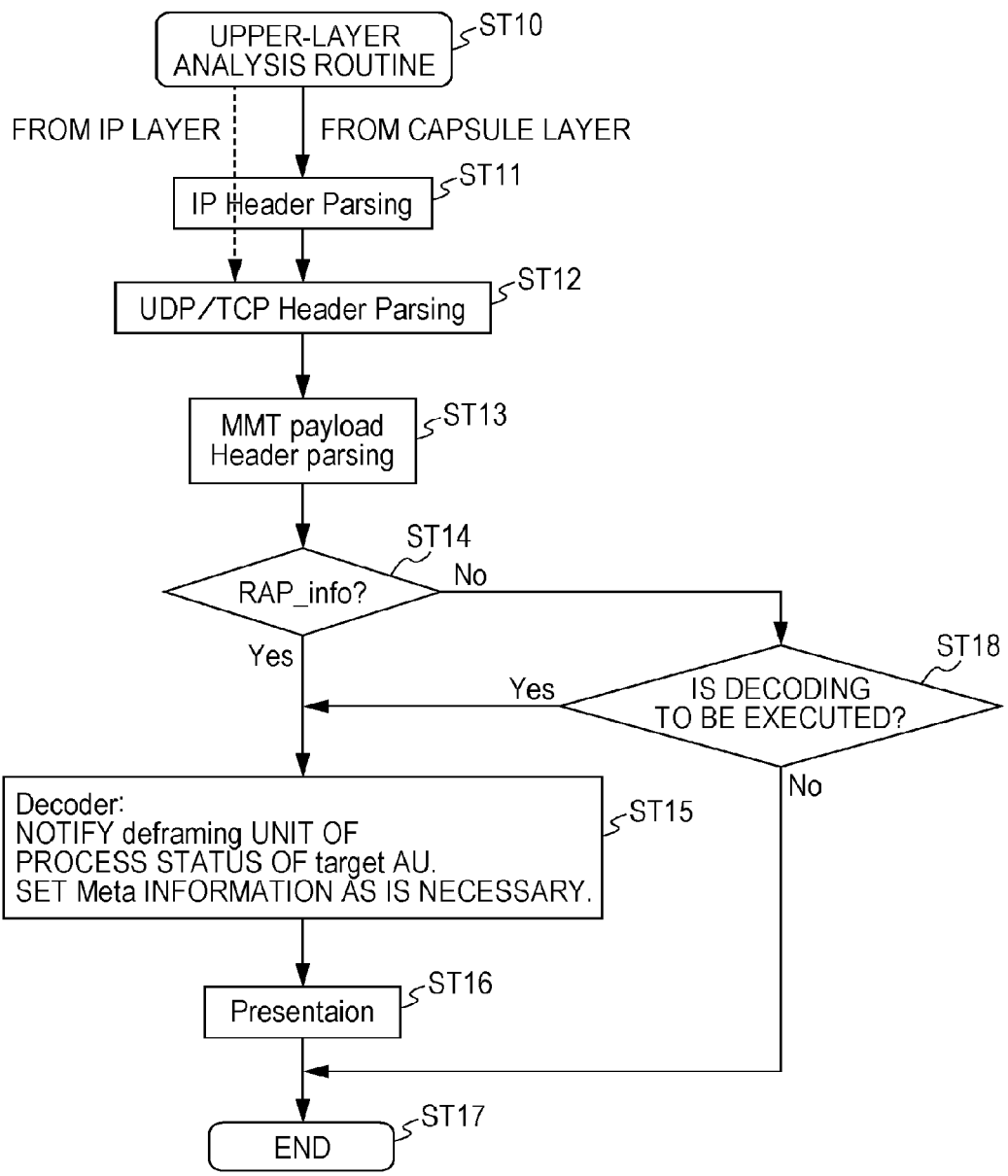
FIG. 31 is a flowchart that illustrates an example of the process of an upper-layer analysis routine.

A flowchart represented in FIG. 31 illustrates an example of the process of the upper-layer analysis routine in Step 50 described above. The receiver 200 starts the process in Step ST10. Thereafter, the receiver 200 analyzes the IP header in Step 11 and analyzes the UDP header or the TCP header in Step ST12. In addition, the receiver 200 analyzes the MMT payload header in Step ST13.

Then, the receiver 200, in Step ST14, determines whether or not "random_access_flag" represents the RAP. When the RAP is represented, the receiver 200 executes a decoding process in Step ST15. When media data such as video is decoded, the receiver 200 executes a presentation process such as image display and audio output in Step ST16 and thereafter, ends the process in Step ST17. In addition, the decoder 203 notifies the CPU 206 of the processing status of the target access unit. Accordingly, the determination of Step ST8 in the flowchart represented in FIG. 30 described above can be executed. In addition, the decoder unit 215 sets meta data information included in the TLV packet in which "non_priority_bit2" is set to "0" as is necessary.

In addition, when "random_access_point_flag" does not represent the RAP in Step ST14, the receiver 200 determines whether to execute a decoding process in Step ST18. For example, when the decoding process for the target access unit has been completed, decoding is determined to be executed. In addition, for the MMT packet in which meta information is included, decoding is determined to be executed. When decoding is determined not to be executed in Step ST18, the receiver 200 immediately ends the process in Step ST17. For example, media data included in the MMT packet immediately after the start of the trick reproduction mode until a first random access point is found, and the like correspond to a case where decoding is determined not to be executed.

Next, a case will be described in which the gateway/network router 205 of the receiver 200 receives a transmission stream of a service transmitted from the distribution server 120 through the communication network 300 and executes the process. In such a case, an IP packet included in the received transmission stream is output from the gateway/network router 205. In addition, in the header of this IP packet, the priority packet identification information and the identification information used for determining whether or not the access position information is included are included.

The IP packet output from the gateway/network router 205 is supplied to the demultiplexer 202. The demultiplexer 202 executes an extraction process for each type (video, audio, metadata, a message, or the like) of data included in the payload for the IP packets that are sequentially supplied from the tuner 201.

The IP packets of each type extracted by the demultiplexer 202 are supplied to the corresponding decoder 203 together with the priority packet identification information. The decoder 203 executes the de-packetizing process and a decoding process as is necessary for the IP packet for each type. The video data acquired by the decoder 203 is supplied to the display 204 as a display unit, whereby an image is displayed. In addition, the audio data acquired by the decoder 203 is supplied to an audio output unit not illustrated in the diagram, for example, a speaker, whereby audio is output. Furthermore, a message and metadata acquired by the decoder 203 are supplied to the CPU 206.

Here, the operation of a case where service switching (random access) of multicast distribution occurs according to a user operation will be described. In such a case, in the receiver 200, a target for the display process is from the first random access point (RAP) of the transmission stream after the service switching. As targets for this random access point, there are the start of an access unit configured only by non-predictive components (an I picture and an IDR picture) and the start point of message information relating thereto.

In this case, while detailed description will not be presented, similar to the case of the switching of the broadcasting channel described above, based on the priority packet identification information included in the header of the IP packet, the analysis process for the header of each packet in the transmission stream up to the first random access point (RAP) is appropriately omitted (see FIG. 25). Accordingly, a delay until decoding/display of a picture of the first random access point decreases, whereby a response time until initial display is shortened.

Next, an operation will be described which is executed in a case where a reproduction command is transmitted to the storage medium 220 according to a user operation, and trick reproduction such as fast forward reproduction or fast reverse reproduction is executed. In such a case, accesses to the storage medium 220 are controlled, and, for example, an IP packet including the access unit of the random access point (RAP) is selectively extracted, and a transmission stream including the IP packet is returned to the gateway/network router 205 as a reproduction transmission stream.

From the gateway/network router 205, the IP packet included in the transmission stream supplied from the storage medium 220 is output. The demultiplexer 202 executes the extraction process for each type (video or audio) of data included in the payload for the IP packets sequentially supplied from the gateway/network router 205. The IP packets of each type extracted by the demultiplexer 202 are supplied to the corresponding decoder 203.

The decoder 203 executes the de-packetizing process and the decoding process for the IP packets for each type. Here, video data acquired by the decoder 203 is supplied to the display 204 as a display unit, and accordingly, an image of the trick reproduction is displayed. In addition, audio data acquired by the decoder 203 is supplied to an audio output unit not illustrated in the diagram, for example, a speaker, and accordingly, audio corresponding to the display image is output.

Figure 32:
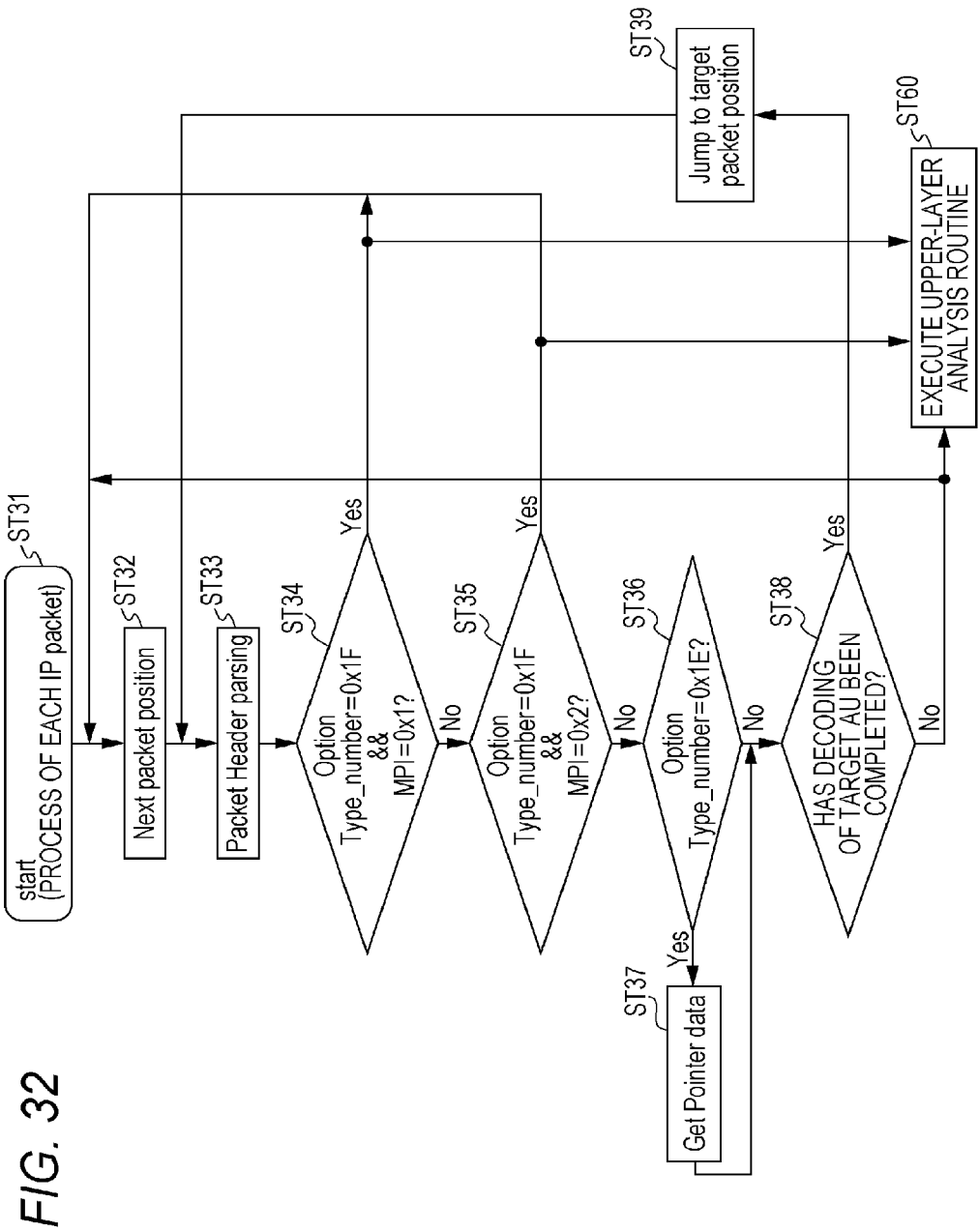
FIG. 32 is a flowchart that illustrates an example of the process of a receiver of a case where a transition is made from a normal reproduction mode to a mode of trick reproduction (fast forward reproduction or fast reverse reproduction).

FIG. 32 illustrates an example of the process of the receiver 200 of a case where a transition is made from a normal reproduction mode to a mode of trick reproduction (fast forward reproduction or fast reverse reproduction) in accordance with a user operation. The receiver 200 starts the process in Step ST31 in accordance with the transition to the trick reproduction mode and thereafter, causes the process to proceed to the process of Step ST32. In this Step ST32, the receiver 200 accesses a storage position of a next IP packet in the storage medium 220 and acquires the IP packet.

Next, in Step ST33, the receiver 200 analyzes the header of the acquired IP packet and recognizes the settings of options and the like. Then, in Step ST34, the receiver 200 determines whether or not "Type_number=0x1F" and "MPI=0x1". Here, "MPI" is an abbreviation of "Media Priority Information". When "Type_number=0x1F" and "MPI=0x1", the receiver 200 causes the process to proceed to Step ST60 and executes the process of an upper-layer analysis routine and, in parallel, returns the process to Step ST12 and executes the process of acquiring a next IP packet from the storage medium 210.

On the other hand, in a case where "Type_number=0x1F" and "MPI=0x1" are not satisfied in Step ST34, the receiver 200 determines whether or not "Type_number=0x1F" and "MPI=0x2" in Step ST35. When "Type_number=0x1F" and "MPI=0x2", the receiver 200 causes the process to proceed to Step ST60 and executes the upper-layer analysis routine and, in parallel, returns the process to Step ST12 and executes the process of acquiring a next IP packet from the storage medium 210.

When "Type_number=0x1F" and "MPI=0x2" are not satisfied in Step ST35, the receiver 200 determines whether or not "Type_number=0x1E" in Step ST36. When it is set that "Type_number=0x1E", the receiver 200 acquires the access position information from the IP packet in Step ST37 and thereafter, in Step ST38, determines whether or not the decoding of the target access unit has ended. This determination is executed based on the decoding status information of the target access unit supplied from the decoder 203. As the target access units, a case where only access units of I pictures of the random access point are included or a case where access units of I pictures and a predetermined number of access units of B pictures and P pictures after that are included may be considered.

When "Type_number=0x1E" is not set in Step ST36, the receiver 200 determines whether or not the decoding of the target access unit has ended in Step ST38. As the target access units, a case where only access units of I pictures of the random access point are included or a case where access units of I pictures and a predetermined number of access units of B pictures and P pictures after that are included may be considered.

When the decoding process for the target access unit has been completed, the receiver 200, in Step ST39, accesses the storage position of a jumped IP packet in the storage medium 220 based on the access position information acquired in Step ST37 described above, acquires the IP packet and, thereafter, returns the process to Step ST33. On the other hand, when the decoding process for the target access unit has not been completed, the receiver 200 causes the process to proceed to Step ST60 and executes the upper-layer analysis routine and, in parallel, returns the process to Step ST32 and executes the process of acquiring a next IP packet from the storage medium 210.

While the example of the process of the upper-layer analysis routine of Step ST60 described above will not be described in detail, it is similar to the upper-layer analysis routine of Step ST50 of the flowchart represented in FIG. 30. However, in the upper-layer analysis routine of Step ST60, since the packet of the lowermost layer is the IP packet, in the upper-layer analysis routine illustrated in FIG. 31, Step ST11 is excluded.

Next, an operation will be described which is executed in a case where a reproduction command is transmitted to the distribution server 120 according to a user operation, and a transmission stream is received, and trick reproduction such as fast forward reproduction or fast reverse reproduction is executed. In such a case, accesses to the distribution server 120 are controlled, and, based on the priority packet identification information included in the header of the IP packet and the access position information, for example, an IP packet including the access unit of the random access point (RAP) is selectively extracted, and a transmission stream including the IP packet is returned to the gateway/network router 205.

From the gateway/network router 205, the IP packet included in the transmission stream supplied from the distribution server 120 is output. The demultiplexer 202 executes the extraction process for each type (video or audio) of data included in the payload for the IP packets sequentially supplied from the gateway/network router 205. The IP packets of each type extracted by the demultiplexer 202 are supplied to the corresponding decoder 203 together with the priority packet identification information.

The decoder 203 executes the de-packetizing process and the decoding process for the IP packets for each type. Here, video data acquired by the decoder 203 is supplied to the display 204 as a display unit, and accordingly, an image of the trick reproduction is displayed. In addition, audio data acquired by the decoder 203 is supplied to an audio output unit not illustrated in the diagram, for example, a speaker, and accordingly, audio corresponding to the display image is output.

As described above, in the display system 10 illustrated in FIG. 1, in the transmission stream, transmission packets (TLV packets or IP packets) including data of the first byte of the access unit of the random access point are arranged to be identifiable at a predetermined interval, and transmission packets (TLV packets or IP packets) including the access position information are arranged following this transmission packets.

Accordingly, on the reception side, for example, in trick reproduction such as fast forward reproduction or fast reverse reproduction after the storage of this transmission stream in the storage medium 210 or 220, control of accesses to the storage medium 210 or 220 is executed based on the identification information or the access position information, and data of an access unit of the random access point that is necessary for the trick reproduction or a predetermined number of access units following the access unit can be efficiently acquired, whereby an increase in the speed of the trick reproduction can be achieved.

<2. Modified Example>

In the embodiment described above, an example has been illustrated in which a TLV packet is used as a packet of the capsule layer in the broadcasting. However, the packet of the capsule layer is not limited to the TLV packet. For example, the packet of the capsule layer may be a generic stream encapsulation (GSE) packet or a packet achieving a role of the same kind as that of such a packet. In addition, similarly, the multiplexed transport packet is not limited to the MMT packet. For example, the multiplexed transport packet may be a real-time transport protocol (RTP) packet, a file delivery over unidirectional transport protocol (FLUTE) packet, or the like.

In addition, in the embodiment described above, in the broadcasting system, an example has been illustrated in which data exchange between the tuner 201 and the storage medium 210 is executed by using the TLV packet. However, such exchange may be executed by using the IP packet. Alternatively, a configuration enabling designation of one thereof may be considered. Also in a case where data is exchanged by using the IP packet as above, since the priority packet identification information, additional information of the access position information, the access position information, and the like are included in the IP packet, for example, an increase in the speed of the trick reproduction can be achieved.

Furthermore, in the embodiment described above, the receiver 200 has been illustrated to include an output unit (presentation unit), in other words, an output unit such as a display or a speaker. However, the output unit of the receiver 200 and the like may be configured to be separately provided. The receiver of such a case has a setup box configuration.

In addition, the present technology may employ a configuration as below.

(1) A transmission apparatus including:

a transmission unit that transmits a transmission stream, in which first transmission packets that are multilayer-configuration packets each having a multiplexed transport packet in an upper layer are continuously arranged, wherein, in the transmission stream, the specific first transmission packets each including the multiplexed transport packet including data in which a first byte of an access unit of a random access point starts and having a header in which identification information is inserted are arranged at a predetermined interval, and, second transmission packets each including access position information corresponding to the previous and next specific first transmission packets and having a header in which identification information is inserted are arranged following the specific first transmission packets.

(2) The transmission apparatus according to (1), wherein the first transmission packet is a packet of a capsule layer acquired by encapsulating an IP packet having a payload including the multiplexed transport packet, and the second transmission packet is a packet of the capsule layer acquired by encapsulating the access position information.

(3) The transmission apparatus according to (2), wherein the packet of the capsule layer is a TLV packet or a GSE packet.

(4) The transmission apparatus according to (1),
wherein the first transmission packet is an IP packet having a payload in which the multiplexed transport packet is included, and
the second transmission packet is an IP packet including the access position information.

(5) The transmission apparatus according to any of (1) to (4), wherein the multiplexed transport packet is an MMT packet, an RTP packet, or a FLUTE packet.

(6) A transmission method including:
transmitting a transmission stream, in which first transmission packets that are multilayer-configuration packets each having a multiplexed transport packet in an upper layer are continuously arranged,
wherein, in the transmission stream, the specific first transmission packets each including the multiplexed transport packet including data in which a first byte of an access unit of a random access point starts and having a header in which identification information is inserted are arranged at a predetermined interval, and, second transmission packets each including access position information corresponding to the previous and next specific first transmission packets and having a header in which identification information is inserted are arranged following the specific first transmission packets.

(7) A reproduction apparatus including:
an acquisition unit that acquires a transmission stream in which first transmission packets that are multilayer-configuration packets each having a multiplexed transport packet in an upper layer are continuously arranged by accessing a storage medium locally connected or a server connected through a communication network;
a processing unit that acquires reproduction data by processing the transmission stream acquired by the acquisition unit; and
an access control unit that controls an access of the acquisition unit to the storage medium or the server based on identification information of the specific first transmission packets and access position information included in the second transmission packet that are extracted from the acquired transmission stream,
wherein, in the transmission stream, the specific first transmission packets each including the multiplexed transport packet including data in which a first byte of an access unit of a random access point starts and having a header in which identification information is inserted are arranged at a predetermined interval, and, second transmission packets each including access position information corresponding to the previous and next specific first transmission packets and having a header in which identification information is inserted are arranged following the specific first transmission packets.

(8) The reproduction apparatus according to (7), further including:
a reception unit that receives the transmission stream through a predetermined transmission channel and stores the received transmission stream in the storage medium,
wherein the predetermined transmission channel is an RF transmission channel or a communication network transmission channel.

(9) The reproduction apparatus according to (7) or (8),
wherein the first transmission packet is a packet of a capsule layer acquired by encapsulating an IP packet having a payload including the multiplexed transport packet, and
the second transmission packet is a packet of the capsule layer acquired by encapsulating the access position information.

(10) The reproduction apparatus according to (9), wherein the packet of the capsule layer is a TLV packet or a GSE packet.

(11) The reproduction apparatus according to (7),
wherein the first transmission packet is an IP packet having a payload in which the multiplexed transport packet is included, and the second transmission packet is an IP packet including the access position information.

(12) The reproduction apparatus according to any of (7) to (9), wherein the multiplexed transport packet is an MMT packet, an RTP packet, or a FLUTE packet.

(13) A reproduction method including:
acquiring a transmission stream in which first transmission packets that are multilayer-configuration packets each having a multiplexed transport packet in an upper layer are continuously arranged by accessing a storage medium locally connected or a server connected through a communication network;
acquiring reproduction data by processing the transmission stream acquired by in the acquiring of a transmission stream; and
controlling an access of the acquisition unit to the storage medium or the server based on identification information of the specific first transmission packets and access position information included in the second transmission packet that are extracted from the acquired transmission stream,
wherein, in the transmission stream, the specific first transmission packets each including the multiplexed transport packet including data in which a first byte of an access unit of a random access point starts and having a header in which identification information is inserted are arranged at a predetermined interval, and, second transmission packets each including access position information corresponding to the previous and next specific first transmission packets and having a header in which identification information is inserted are arranged following the specific first transmission packets.

(14) A reception apparatus including:
a reception unit that receives a transmission stream, in which first transmission packets that are multilayer-configuration packets each having a multiplexed transport packet in an upper layer are continuously arranged; and
a processing unit that acquires reception data by processing the transmission stream acquired by the reception unit,
wherein, in the transmission stream, the specific first transmission packets each including the multiplexed transport packet including data in which a first byte of an access unit of a random access point starts and having a header in which identification information is inserted are arranged at a predetermined interval, and, second transmission packets each including access position information corresponding to the previous and next specific first transmission packets and having a header in which identification information is inserted are arranged following the specific first transmission packets.

Figure 18:
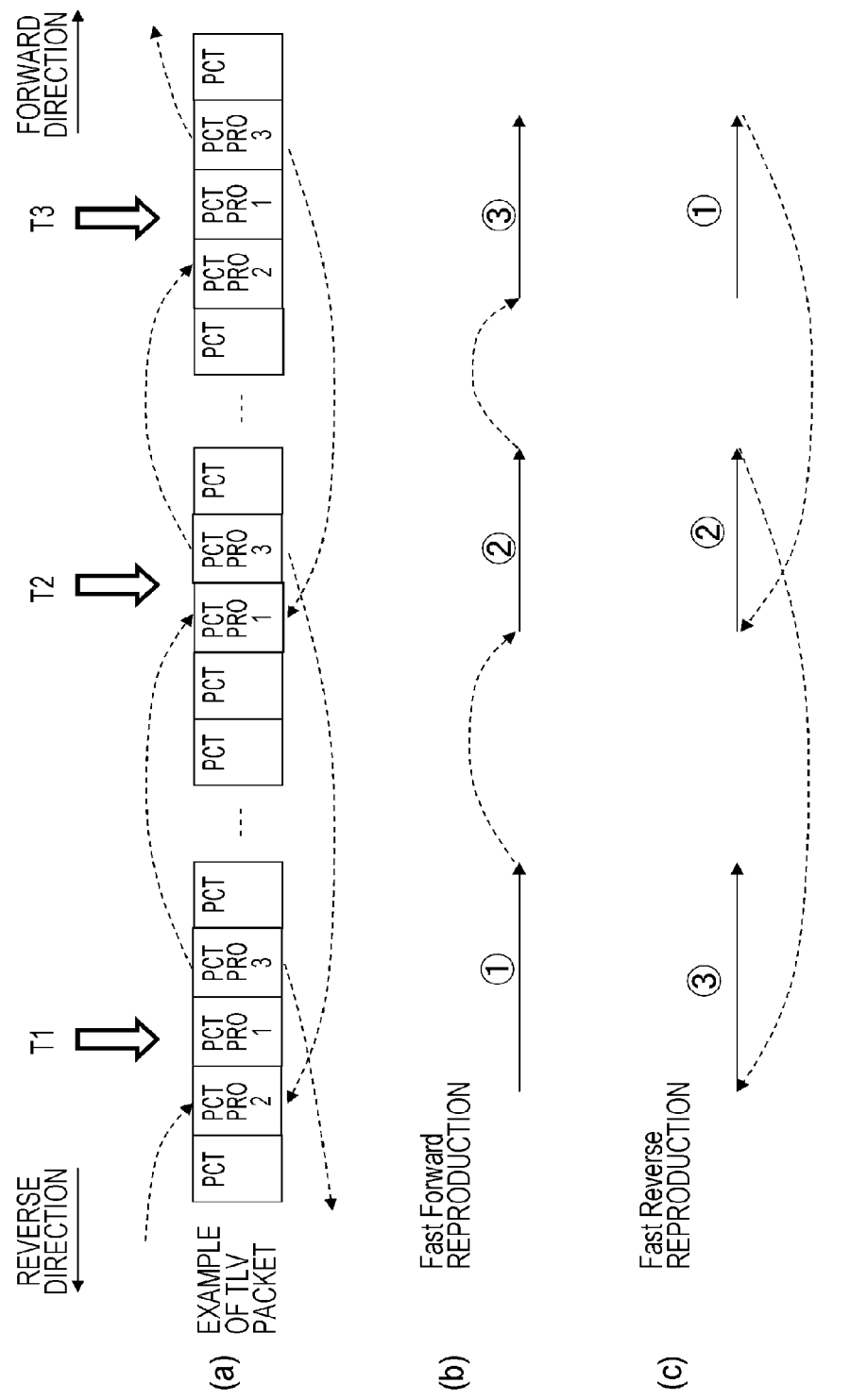
FIGS. 18(a) to 18(c) are diagrams that illustrate a transmission stream (TLV packet stream) transmitted by a broadcast station.

The main feature of the present technology is to increase the speed of trick reproduction such as fast forward reproduction and fast reverse reproduction by inserting the identification information used for identifying a packet to be handled with high priority, the information used for identifying whether or not the access position information used for the trick reproduction is included, and the access position information in a packet (transmission packet) of a capsule layer acquired by encapsulating an IP packet in which a multiplexed transport packet is included in the payload (see FIGS. 1, 13, and 18).

REFERENCE SIGNS LIST

10 Display system
110 Broadcasting station
111 Transmission system
112 Encoder unit
113 Multiplexer unit
114 Framing unit
115 Modulator/emission unit
120 Distribution server
200 Receiver
201 Tuner
202 Demultiplexer
203 Decoder
204 Display
205 Gateway/network router
206 CPU
207 User operation unit
210 Storage medium
211 Reception/reproduction system
212 Tuner/Demodulator
213 Deframing unit
214 Demultiplexer unit
215 Decoder unit
216 Media interface
220 Storage medium

The invention claimed is:

1. A transmission apparatus comprising:
circuitry configured to
generate a transmission stream including first transmission packets, each including a header indicating that a first byte of an access unit of a random access point is included in the respective first transmission packet, each first transmission packet corresponding to a packet group,
the transmission stream including second transmission packets each including a header and being arranged immediately following the first transmission packets in each packet group, each second transmission packet including access position information offsets including pointers to third transmission packets or first transmission packets of a previous packet group and a next packet group,
wherein one or more packet groups include at least one third transmission packet, the third transmission packets are arranged immediately before a first transmission packet of the previous packet group and immediately before a first transmission packet of the next packet group, each third transmission packet including timing information or a start portion of attribute information at a time of displaying a random access point; and
transmit the transmission stream to a receiver in order for the receiver to control access to the transmission stream based on headers of the first transmission packets and access position information included in the second transmission packets in the transmitted transmission stream.

2. The transmission apparatus according to claim 1, wherein each first transmission packet is a packet of a capsule layer acquired by encapsulating an Internet Protocol (IP) packet having a payload including a multiplexed transport packet, and
each second transmission packet is a packet of the capsule layer acquired by encapsulating the access position information.

3. The transmission apparatus according to claim 2, wherein the packet of the capsule layer is a Type Length Value (TLV) packet or a Generic Stream Encapsulation (GSE) packet.

4. The transmission apparatus according to claim 1,
wherein each first transmission packet is an Internet Protocol (IP) packet having a payload in which a multiplexed transport packet is included, and
each second transmission packet is an IP packet including the access position information.

5. The transmission apparatus according to claim 2, wherein the multiplexed transport packet is a Moving Picture Experts Group (MPEG) Media Transport (MMT) packet, a Real-time Transport Protocol (RTP) packet, or a File Delivery Over Unidirectional Transport Protocol (FLUTE) packet.

6. A transmission method comprising:
generating a transmission stream including first transmission packets, each including a header indicating that a first byte of an access unit of a random access point is included in the respective first transmission packet, each first transmission packet corresponding to a packet group,
the transmission stream including second transmission packets each including a header and being arranged immediately following the first transmission packets in each packet group, each second transmission packet including access position information offsets including pointers to third transmission packets or first transmission packets of a previous packet group and a next packet group,
wherein one or more packet groups include at least one third transmission packet, the third transmission packets are arranged immediately before a first transmission packet of the previous packet group and immediately before a first transmission packet of the next packet group, each third transmission packet including timing information or a start portion of attribute information at a time of displaying a random access point; and
transmitting the transmission stream to a receiver in order for the receiver to control access to the transmission stream based on headers of the first transmission packets and access position information included in the second transmission packets in the transmitted transmission stream.

7. A reproduction apparatus comprising:
circuitry configured to
acquire, by accessing a storage medium locally connected or a server connected through a communication network, a transmission stream including first transmission packets, each including a header indicating that a first byte of an access unit of a random access point is included in the respective first transmission packet, each first transmission packet corresponding to a packet group,
the transmission stream including second transmission packets each including a header and being arranged immediately following the first transmission packets in each packet group, each second transmission packet including access position information offsets including pointers to third transmission packets or first transmission packets of a previous packet group and a next packet group,
wherein one or more packet groups include at least one third transmission packet, the third transmission packets are arranged immediately before a first transmission packet of the previous packet group and immediately before a first transmission packet of the next packet group, each third transmission packet including timing information or a start portion of attribute information at a time of displaying a random access point;

acquire reproduction data by processing the acquired transmission stream; and control access to the transmission stream stored in the storage medium or the server based on headers of the first transmission packets and access position information included in the second transmission packets in the acquired transmission stream.

8. The reproduction apparatus according to claim 7, wherein the circuitry is further configured to receive the transmission stream through a predetermined transmission channel and store the received transmission stream in the storage medium, wherein the predetermined transmission channel is an RF transmission channel or a communication network transmission channel.

9. The reproduction apparatus according to claim 7, wherein each first transmission packet is a packet of a capsule layer acquired by encapsulating an Internet Protocol (IP) packet having a payload including a multiplexed transport packet, and each second transmission packet is a packet of the capsule layer acquired by encapsulating the access position information.

10. The reproduction apparatus according to claim 9, wherein the packet of the capsule layer is a Type Length Value (TLV) packet or a Generic Stream Encapsulation (GSE) packet.

11. The reproduction apparatus according to claim 7, wherein each first transmission packet is an Internet Protocol (IP) packet having a payload in which a multiplexed transport packet is included, and each second transmission packet is an IP packet including the access position information.

12. The reproduction apparatus according to claim 7, wherein the multiplexed transport packet is a Moving Picture Experts Group (MPEG) Media Transport (MMT) packet, a Real-time Transport Protocol (RTP) packet, or a File Delivery Over Unidirectional Transport Protocol (FLUTE) packet.

13. A reproduction method comprising:

acquiring, by accessing a storage medium locally connected or a server connected through a communication network, a transmission stream including first transmission packets, each including a header indicating that a first byte of an access unit of a random access point is included in the respective first transmission packet, each first transmission packet corresponding to a packet group, the transmission stream including second transmission packets each including a header and being arranged immediately following the first transmission packets in each packet group, each second transmission packet including access position information offsets including pointers to third transmission packets or first transmission packets of a previous packet group and a next packet group, wherein one or more packet groups include at least one third transmission packet, the third transmission packets are arranged immediately before a first transmission packet of the previous packet group and immediately before a first transmission packet of the next packet group, each third transmission packet including timing information or a start portion of attribute information at a time of displaying a random access point;

acquiring reproduction data by processing the acquired transmission stream; and controlling access to the transmission stream stored in the storage medium or the server based on headers of the first transmission packets and access position information included in the second transmission packets in the acquired transmission stream.

14. The reproduction method according to claim 13, wherein each first transmission packet is a packet of a capsule layer acquired by encapsulating an Internet Protocol (IP) packet having a payload including a multiplexed transport packet, and each second transmission packet is a packet of the capsule layer acquired by encapsulating the access position information.

15. The reproduction method according to claim 14, wherein the packet of the capsule layer is a Type Length Value (TLV) packet or a Generic Stream Encapsulation (GSE) packet.

16. The reproduction method according to claim 13, wherein each first transmission packet is an Internet Protocol (IP) packet having a payload in which a multiplexed transport packet is included, and each second transmission packet is an IP packet including the access position information.

17. A reception apparatus comprising:

circuitry configured to receive a transmission stream including first transmission packets, each including a header indicating that a first byte of an access unit of a random access point is included in the respective first transmission packet, each first transmission packet corresponding to a packet group, the transmission stream including second transmission packets each including a header and being arranged immediately following the first transmission packets in each packet group, each second transmission packet including access position information offsets including pointers to third transmission packets or first transmission packets of a previous packet group and a next packet group, wherein one or more packet groups include at least one third transmission packet, the third transmission packets are arranged immediately before a first transmission packet of the previous packet group and immediately before a first transmission packet of the next packet group, each third transmission packet including timing information or a start portion of attribute information at a time of displaying a random access point; and acquire reception data by processing the acquired transmission stream acquired by the reception unit.

18. The reception apparatus according to claim 17, wherein each first transmission packet is a packet of a capsule layer acquired by encapsulating an Internet Protocol (IP) packet having a payload including a multiplexed transport packet, and each second transmission packet is a packet of the capsule layer acquired by encapsulating the access position information.

19. The reception apparatus according to claim 18, wherein the packet of the capsule layer is a Type Length Value (TLV) packet or a Generic Stream Encapsulation (GSE) packet.

20. The reception apparatus according to claim 17,
wherein each first transmission packet is an Internet Protocol (IP) packet having a payload in which a multiplexed transport packet is included, and
each second transmission packet is an IP packet including the access position information.

* * * * *